US011658862B2

(12) United States Patent
Belmonte

(10) Patent No.: US 11,658,862 B2
(45) Date of Patent: *May 23, 2023

(54) HARDWARE SERVER AND TECHNICAL METHOD TO OPTIMIZE BULK PRINTING OF PHYSICAL ITEMS

(71) Applicant: Steve Belmonte, Atascadero, CA (US)

(72) Inventor: Steve Belmonte, Atascadero, CA (US)

(73) Assignee: Accuzip, Inc., Atascadero, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,943

(22) Filed: Jul. 7, 2021

(65) Prior Publication Data

US 2021/0336840 A1 Oct. 28, 2021

Related U.S. Application Data

(63) Continuation-in-part of application No. 16/203,583, filed on Nov. 28, 2018, now Pat. No. 11,153,146.
(Continued)

(51) Int. Cl.
*H04L 41/06* (2022.01)
*G06Q 10/08* (2023.01)
(Continued)

(52) U.S. Cl.
CPC ......... *H04L 41/06* (2013.01); *G06Q 10/0833* (2013.01); *G06V 30/416* (2022.01);
(Continued)

(58) Field of Classification Search
CPC ....... H04L 41/06; H04L 51/00; H04L 51/234; H04L 43/0817; G06Q 10/08;
(Continued)

(56) References Cited

U.S. PATENT DOCUMENTS 6,188,997 B1 * 2/2001 Ratzenberger, Jr. ....................... G07B 17/00508
705/410
6,246,993 B1 6/2001 Dreyer et al.
(Continued)

FOREIGN PATENT DOCUMENTS

WO 2018136101 a1 7/2018
WO 2020040366 A1 2/2020

OTHER PUBLICATIONS

"AccuZIP6 bulk mail postal software" by AccuZip, Found Online on [Aug. 9, 2021] https://www.accuzip.com/products/mailing-software/.
(Continued)

*Primary Examiner* — James N Fiorillo
(74) *Attorney, Agent, or Firm* — LegalForce RAPC Worldwide

(57) ABSTRACT

A method includes distributing a number of printer devices across a computer network with corresponding logistical nodes, and, through a server, dynamically extracting, from a number of digital pre-print files, metadata related to documents and pre-conditions based on scanning thereof, and classifying the number of digital pre-print files into groups based on an extent to which the dynamically extracted metadata is shared between constituents thereof. The method also includes, through the server, matching each classified group to a logistical node based on the dynamically extracted metadata shared between the constituents and dynamically tracked printer characteristics, commingling the extracted metadata within the each classified group into a master document in which the extracted metadata is laid out to enable printing through a printer device associated with the matched logistical node, and reclassifying a con-
(Continued)

stituent of the classified group under another group based on a status of unsuitability of the printer device.

20 Claims, 19 Drawing Sheets

Related U.S. Application Data which is a continuation-in-part of application No. 14/995,194, filed on Jan. 13, 2016, now abandoned, which is a continuation-in-part of application No. 14/475,599, filed on Sep. 3, 2014, now Pat. No. 9,264,297, which is a continuation of application No. 14/079,633, filed on Nov. 13, 2013, now Pat. No. 9,479,390.

(60) Provisional application No. 61/726,555, filed on Nov. 14, 2012.

(51) Int. Cl.

| | | |
|---|---|---|
| *G07B 17/00* | (2006.01) | |
| *H04L 51/00* | (2022.01) | |
| *G06V 30/416* | (2022.01) | |
| *H04L 51/234* | (2022.01) | |
| *G06Q 10/0833* | (2023.01) | |

(52) U.S. Cl.
CPC ....... *G07B 17/00* (2013.01); *G07B 17/00435* (2013.01); *H04L 51/00* (2013.01); *H04L 51/234* (2022.05)

(58) Field of Classification Search
CPC ............. G06Q 10/0833; G06V 30/416; G07B 17/00508; G07B 17/00467; G07B 17/00661; G07B 2017/00483; G07B 2017/00588; G07B 2017/00596; G07B 2017/00709; G01G 19/00; G06K 9/00
USPC ........................................................ 709/202
See application file for complete search history.

(56) References Cited

U.S. PATENT DOCUMENTS

| | | | | |
|---|---|---|---|---|
| 6,343,327 B2* | 1/2002 | Daniels, Jr. | ............. | H04L 51/00 709/239 |
| 6,570,670 B1* | 5/2003 | Salgado | ................ | G06F 3/1213 710/39 |
| 6,810,390 B1* | 10/2004 | Picoult | ............. | G07B 17/00435 705/401 |
| 6,976,798 B2* | 12/2005 | Keane | ................... | G06F 3/1287 358/1.15 |
| 7,035,856 B1* | 4/2006 | Morimoto | ............. | B65D 23/14 707/999.01 |
| 7,079,269 B2* | 7/2006 | Teeuwen | ............ | H04N 1/32358 358/1.15 |
| 7,195,336 B2* | 3/2007 | Silverbrook | ............. | B41J 29/02 347/108 |
| 7,202,962 B2* | 4/2007 | Roosen | ................ | G06F 3/1291 358/1.15 |
| 7,370,090 B2* | 5/2008 | Nakaoka | ................ | G06F 3/1267 709/219 |
| 7,389,238 B2* | 6/2008 | Sansone | ........... | G07B 17/00016 705/1.1 |
| 7,593,125 B2* | 9/2009 | Wang | ................ | H04N 1/32545 709/224 |
| 7,684,994 B2* | 3/2010 | Kodger, Jr. | ........ | G06Q 10/0631 340/505 |
| 7,692,807 B1* | 4/2010 | Sanders | ................ | G06F 3/1289 358/1.15 |
| 7,895,130 B2* | 2/2011 | Pintsov | ............ | G07B 17/00435 705/330 |
| 7,974,852 B2* | 7/2011 | Morales | ............. | G06Q 10/0833 705/333 |
| 7,986,806 B2* | 7/2011 | Rhoads | ................... | G07F 7/086 235/462.34 |
| 8,023,129 B2* | 9/2011 | Kawai | ................... | G06F 3/1211 358/1.14 |
| 8,033,470 B2* | 10/2011 | Maeda | ...................... | G06K 7/14 235/462.24 |
| 8,059,292 B2* | 11/2011 | Rai | ....................... | G06Q 10/06 358/1.14 |
| 8,218,170 B2* | 7/2012 | Klopsch | ................ | G06F 3/1211 705/401 |
| 8,427,670 B2* | 4/2013 | Rai | ....................... | G06F 3/1261 358/1.9 |
| 8,457,782 B2* | 6/2013 | Ksiazek | ................... | B07C 3/12 705/401 |
| 8,477,992 B2* | 7/2013 | Paul | ..................... | G06V 30/186 382/209 |
| 8,495,737 B2* | 7/2013 | Sinha | .................. | H04L 63/1441 726/22 |
| 8,498,205 B2* | 7/2013 | Gilmour | ............ | H04L 43/0817 370/229 |
| 8,520,888 B2 | 8/2013 | Spitzig et al. | | |
| 8,521,658 B2* | 8/2013 | Raney | ................ | G06Q 10/0833 414/265 |
| 8,526,038 B2* | 9/2013 | Ida | ........................ | G06F 3/1212 358/1.15 |
| 8,531,706 B2* | 9/2013 | Ciocarlie | .............. | G06F 3/1253 358/1.15 |
| 8,599,412 B2* | 12/2013 | Narushima | ........... | G06F 1/3284 358/421 |
| 8,854,669 B1* | 10/2014 | Jazayeri | ................ | G06F 3/1288 358/1.15 |
| 8,977,385 B2* | 3/2015 | Bowers | ..................... | B07C 3/00 700/226 |
| 9,053,584 B2* | 6/2015 | Otey | ..................... | G06F 3/1218 |
| 9,176,699 B2* | 11/2015 | Fukudome | ............ | G06F 3/1238 |
| 9,229,662 B2* | 1/2016 | LaVigne | ................ | G06F 3/1296 |
| 9,292,230 B2* | 3/2016 | Scheller | ................ | G06F 3/1288 |
| 9,346,644 B2* | 5/2016 | Kudrus | .................. | B41J 13/12 |
| 9,354,832 B2* | 5/2016 | Shirai | ................... | G06F 3/1234 |
| 9,535,643 B2* | 1/2017 | Waller | ................. | G06F 3/1253 |
| 9,600,218 B2* | 3/2017 | Liebelt | ................. | G06F 3/1263 |
| 10,049,292 B2* | 8/2018 | Walsh | .................. | G06V 30/416 |
| 10,078,478 B2* | 9/2018 | Bilan | ................... | G06F 3/1288 |
| 2003/0212644 A1* | 11/2003 | McLintock | .......... | G06Q 10/107 705/402 |
| 2004/0073720 A1* | 4/2004 | Clough | .................. | H04L 41/044 710/15 |
| 2004/0207867 A1* | 10/2004 | Stringham | ............ | H04L 51/066 358/1.15 |
| 2005/0154684 A1* | 7/2005 | Wilke | .................. | G06Q 10/107 705/401 |
| 2005/0154884 A1* | 7/2005 | Van Den Tillaart | ........................ | H04L 69/329 713/165 |
| 2005/0179936 A1* | 8/2005 | Sedky | ..................... | G06F 3/126 358/1.15 |
| 2006/0023256 A1* | 2/2006 | Jansen | ................ | H04N 1/32502 358/1.15 |
| 2006/0248155 A1* | 11/2006 | Bondarenko | ........ | G06Q 10/107 709/206 |
| 2006/0248579 A1* | 11/2006 | Gerritsen | ............. | G06Q 10/107 726/9 |
| 2007/0129957 A1* | 6/2007 | Elliott | .............. | G07B 17/00435 705/408 |
| 2007/0247664 A1* | 10/2007 | Yamamoto | ............ | G06F 3/1226 358/1.16 |
| 2008/0005042 A1* | 1/2008 | Ryan | .................. | G07B 17/0008 705/408 |
| 2008/0291486 A1* | 11/2008 | Isles | ................. | G07B 17/00467 358/1.15 |
| 2009/0313060 A1* | 12/2009 | Evevsky | ................ | G06Q 30/0255 705/332 |
| 2010/0293111 A1* | 11/2010 | Van Gorp | ................ | B07C 5/3412 705/402 |

(56) References Cited

U.S. PATENT DOCUMENTS

| | | | | |
|---|---|---|---|---|
| 2012/0092719 A1* | 4/2012 | Jaudon | ............... | G06F 3/122 |
| | | | | 358/1.15 |
| 2012/0188583 A1* | 7/2012 | Stone | ............... | G06F 3/1288 |
| | | | | 358/1.14 |
| 2015/0212776 A1* | 7/2015 | Huster | ............... | G06F 3/1288 |
| | | | | 358/1.14 |
| 2016/0011820 A1* | 1/2016 | Shimazawa | ......... | G06F 3/1288 |
| | | | | 358/1.14 |
| 2016/0132982 A1* | 5/2016 | Belmonte | ....... | G06Q 10/06315 |
| | | | | 705/7.25 |
| 2016/0239802 A1* | 8/2016 | Burch, V | ......... | G06Q 10/0833 |
| 2018/0005336 A1* | 1/2018 | Nolan | ............... | G06Q 50/28 |
| 2018/0096175 A1* | 4/2018 | Schmeling | ......... | G06F 1/3206 |
| 2019/0097870 A1* | 3/2019 | Belmonte | ......... | G06Q 10/0833 |
| 2019/0265917 A1* | 8/2019 | Lawrence | ............ | G06F 3/1232 |

OTHER PUBLICATIONS

"SendPro" by Pitney Bowes, Found Online on [Aug. 9, 2021 ] https://www.pitneybowes.com/us/shipping-and-mailing/oniine-postage-service.html.
"MAILERS+4 Postal Automation Software" by MAILERS+4, Found Online on [Aug. 9, 2021] https://www.melissa.com/direct/direct-mail/mailers4-postal-automation-software.
"Bulk Mailer" by Bulk Mailer SMB, Found Online on [Aug. 9, 2021] https://bccsoftware.com/soft.ware/mail-presort-suite/bulk-mailer-smb/.

* cited by examiner

HARDWARE SERVER AND TECHNICAL METHOD TO OPTIMIZE BULK PRINTING OF PHYSICAL ITEMS

CLAIM OF PRIORITY

This patent application is a Continuation-In-Part application of, and hereby incorporates by reference the entirety of the disclosures of, and claims priority to each of the following cases:

(1) co-pending U.S. patent application Ser. No. 16/203,583 titled HARDWARE SERVER AND TECHNICAL METHOD TO OPTIMIZE BULK PRINTING OF MAILING ITEMS filed on Nov. 28, 2018, which is a Continuation-in-Part application of U.S. Utility patent application Ser. No. 14/995,194 titled HARDWARE SERVER AND TECHNICAL METHOD TO OPTIMIZE PRINTING LOCATION OF DISTRIBUTED BULK MAIL filed on Jan. 13, 2016, which is a Continuation-in-Part application of:

U.S. patent application Ser. No. 14/475,599 titled AUTOMATIC INITIATION OF A RESPONSE ACTION WHEN AN EVENT ASSOCIATED WITH AN ITEM IN TRANSIT IS BASED ON LOGISTICAL NODE SCAN DATA filed on Sep. 3, 2014 and issued as U.S. Pat. No. 9,264,297 on Feb. 16, 2016, which is a continuation application of:

U.S. patent application Ser. No. 14/079,633 titled AUTOMATIC INITIATION OF A RESPONSE ACTION WHEN AN EVENT ASSOCIATED WITH AN ITEM IN TRANSIT IS BASED ON LOGISTICAL NODE SCAN DATA filed on Nov. 13, 2013 and issued as U.S. Pat. No. 9,479,390 on Oct. 25, 2016, which further claims priority to U.S. Provisional Patent Application No. 61/726,555 titled TRIGGER ACTIVATION BY WAY OF A SCAN OF A MAIL PIECE filed on Nov. 14, 2012.

FIELD OF TECHNOLOGY

This disclosure relates generally to distributed computing systems and, more particularly, to a method, a device and/or a system of a hardware server and technical method to optimize bulk printing of physical items.

BACKGROUND

Bulk mail may be sent by commercial mailers such as banks, credit card companies, utility companies, restaurants, etc. Bulk mail may be quantities of postal mail prepared for mailing at reduced postage rates. The preparation may include presorting and placing into containers by some order. The containers, along with a manifest, may be taken to an area in a post office such as a bulk-mail-entry unit (BMEU). The presorting and the use of containers may allow highly automated mail processing, both in bulk and piecewise.

Depending on the postage level, certain conditions might be required for an additional discount: minimum number of pieces (e.g., 200), weight limits, ability for the logistics provider (e.g., United Parcel Service®, FedEx®, Amazon®, USPS®) to process by machine, addresses formatting standardized barcode, presorted by three-digit postal code prefix, five-digit postal code, ZIP+4, or 11-digital delivery point, delivered in trays, bundles, or pallets partitioned by destination, delivered directly to a regional network distribution center (NDC), destination sectional center facility (SCF), destination post office or delivery unit (DU), certification of mailing list accuracy and freshness (e.g., correct postal codes, purging of stale addresses, processing of change-of-address notifications).

While many discounts may be available, a bulk mailer may not be able to take advantage of the discounts which require the bulk mail to be deposited at the destination NDC (DNDC), the destination SCF (DSCF) or the destination DU (DDU). Such discounts may be offered because of the reduction in transportation and distribution cost.

A bulk mailer may subcontract a certified local printer to print a large quantity of mail pieces. The mail piece may have the post address and machine-readable barcode pre-printed. The mail piece may be pre-stamped and pre-canceled (with the stamp postmarked with a date and a location to prevent its use on future mailings). The mail pieces may be sorted according to NDC, SCF, DU, carrier route or carrier walk sequence and put into appropriate containers. The mail pieces may be shipped to a nearby NDC and mailed as bulk mail. One problem for the bulk mailer may be that the mail pieces may not be mailed in the destination NDC, destination SCF or destination DU such that the mailing service needs to ship the mail to the corresponding DNDC, DSCF or the DDU. As a result, the destination discounts (e.g., discounts for DNDC, DSCF and DDU) which are significant cannot be applied.

Another problem may be that, even if the mail pieces can be mailed in the DNDC, DSCF or the DDU, the volume may be too small to satisfy the minimum amount requirement. Take DDU as an example. While DDU discounts are significant and the bulk mail amount may be significant, DDUs are numerous with each DDU corresponding to a relatively small geographic region such that many DDUs may have such small portions of the bulk mail that the minimum amount requirement may not be satisfied.

SUMMARY

Disclosed are a method and/or a device of a hardware server and technical method to optimize bulk printing of physical items.

In one aspect, a method includes distributing each printer device of a number of printer devices across a computer network with a corresponding each logistical node of a number of logistical nodes associated therewith, with the corresponding each logistical node being a data processing device, and determining, through a server communicatively coupled to the number of printer devices via the computer network, receipt of a number of digital pre-print files included in a corresponding number of requests. Each of the number of requests originates from a client device of a number of client devices communicatively coupled to the server through the computer network. The number of requests is relevant to printing a number of physical items. The client device of the number of client devices originating the each request is relevant to a physical item of the number of physical items, and each of the number of digital pre-print files specifies printing and layout information pertinent to a corresponding physical item of the number of physical items.

The method also includes, through the server, dynamically extracting, from the number of digital pre-print files, metadata relevant to documents related to the number of physical items to be printed and metadata representing auxiliary information specifying pre-conditions associated with the corresponding number of requests based on automatically scanning the each of the number of digital pre-print files, classifying, through the server, the number of digital pre-print files into groups based on an extent to which the dynamically extracted metadata is shared between constituents thereof, dynamically tracking the each printer device of the number of printer devices through the corresponding each logistical node in conjunction with the server for printer characteristics thereof following the classification of the number of digital pre-print files into the groups, and matching, through the server, each classified group to a logistical node based on the dynamically extracted metadata shared between the constituents thereof and the dynamically tracked printer characteristics.

Further, the method includes commingling, through the server, the extracted metadata related to all of the constituents of the each classified group into a master document in which the commingled extracted metadata is laid out to enable printing thereof through a printer device associated with the matched logistical node, determining, through the server, a status of unsuitability of the printer device associated with the matched logistical node based on a sensor associated with the printer device transmitting status information of the printer device and/or an environment surrounding the printer device to the server via the matched logistical node, with the determined status of unsuitability modifying the printer characteristics of the printer device that causes exclusion of the printer device for distribution of any of the number of digital pre-print files thereto and/or updation of an administrator of the matched logistical node with a requirement to change a component of the printer device, and reclassifying, through the server, one or more constituent(s) of the classified group associated with the matched logistical node under another classified group to enable matching thereof to another logistical node based on the determined status of unsuitability.

In another aspect, a non-transitory medium, readable through a server and including instructions embodied therein that are executable through the server, includes instructions to distribute each printer device of a number of printer devices across a computer network with a corresponding each logistical node of a number of logistical nodes associated therewith, with the corresponding each logistical node being a data processing device and the number of printer devices being communicatively coupled to the server via the computer network, and instructions to determine receipt of a number of digital pre-print files included in a corresponding number of requests. Each of the number of requests originates from a client device of a number of client devices communicatively coupled to the server through the computer network. The number of requests is relevant to printing a number of physical items. The client device of the number of client devices originating the each request is relevant to a physical item of the number of physical items, and each of the number of digital pre-print files specifies printing and layout information pertinent to a corresponding physical item of the number of physical items.

The non-transitory medium also includes instructions to dynamically extract, from the number of digital pre-print files, metadata relevant to documents related to the number of physical items to be printed and metadata representing auxiliary information specifying pre-conditions associated with the corresponding number of requests based on automatically scanning the each of the number of digital pre-print files, instructions to classify the number of digital pre-print files into groups based on an extent to which the dynamically extracted metadata is shared between constituents thereof, instructions to dynamically track the each printer device of the number of printer devices in conjunction with the corresponding each logistical node for printer characteristics thereof following the classification of the number of digital pre-print files into the groups, and instructions to match each classified group to a logistical node based on the dynamically extracted metadata shared between the constituents thereof and the dynamically tracked printer characteristics.

Further, the non-transitory medium includes instructions to commingle the extracted metadata related to all of the constituents of the each classified group into a master document in which the commingled extracted metadata is laid out to enable printing thereof through a printer device associated with the matched logistical node, instructions to determine a status of unsuitability of the printer device associated with the matched logistical node based on a sensor associated with the printer device transmitting status information of the printer device and/or an environment surrounding the printer device to the server via the matched logistical node, with the determined status of unsuitability modifying the printer characteristics of the printer device that causes exclusion of the printer device for distribution of any of the number of digital pre-print files thereto and/or updation of an administrator of the matched logistical node with a requirement to change a component of the printer device, and instructions to reclassify one or more constituent(s) of the classified group associated with the matched logistical node under another classified group to enable matching thereof to another logistical node based on the determined status of unsuitability.

In yet another aspect, a server includes a memory and a processor communicatively coupled to the memory. The processor executes instructions to distribute each printer device of a number of printer devices across a computer network with a corresponding each logistical node of a number of logistical nodes associated therewith, with the corresponding each logistical node being a data processing device and the number of printer devices being coupled to the server through the computer network, and to determine receipt of a number of digital pre-print files included in a corresponding number of requests. Each of the number of requests originates from a client device of a number of client devices communicatively coupled to the server through the computer network. The number of requests is relevant to printing a number of physical items. The client device of the number of client devices originating the each request is relevant to a physical item of the number of physical items, and each of the number of digital pre-print files specifies printing and layout information pertinent to a corresponding physical item of the number of physical items.

The processor also executes instructions to dynamically extract, from the number of digital pre-print files, metadata relevant to documents related to the number of physical items to be printed and metadata representing auxiliary information specifying pre-conditions associated with the corresponding number of requests based on automatically scanning the each of the number of digital pre-print files, to classify the number of digital pre-print files into groups based on an extent to which the dynamically extracted metadata is shared between constituents thereof, dynamically track the each printer device of the number of printer devices in conjunction with the corresponding each logistical node for printer characteristics thereof following the classification of the number of digital pre-print files into the groups, and to match each classified group to a logistical node based on the dynamically extracted metadata shared between the constituents thereof and the dynamically tracked printer characteristics.

Further, the processor executes instructions to commingle the extracted metadata related to all of the constituents of the each classified group into a master document in which the commingled extracted metadata is laid out to enable printing thereof through a printer device associated with the matched logistical node, to determine a status of unsuitability of the printer device associated with the matched logistical node based on a sensor associated with the printer device transmitting status information of at the printer device and/or an environment surrounding the printer device to the server via the matched logistical node, with the determined status of unsuitability modifying the printer characteristics of the printer device that causes exclusion of the printer device for distribution of any of the number of digital pre-print files thereto and/or updation of an administrator of the matched logistical node with a requirement to change a component of the printer device, and to reclassify one or more constituent(s) of the classified group associated with the matched logistical node under another classified group to enable matching thereof to another logistical node based on the determined status of unsuitability.

Other features will be apparent from the accompanying drawings and from the detailed description that follows.

BRIEF DESCRIPTION OF THE FIGURES

The embodiments of this disclosure are illustrated by way of example and not limitation in the Figures of the accompanying drawings, in which like references indicate similar elements and in which.

Figure 1:
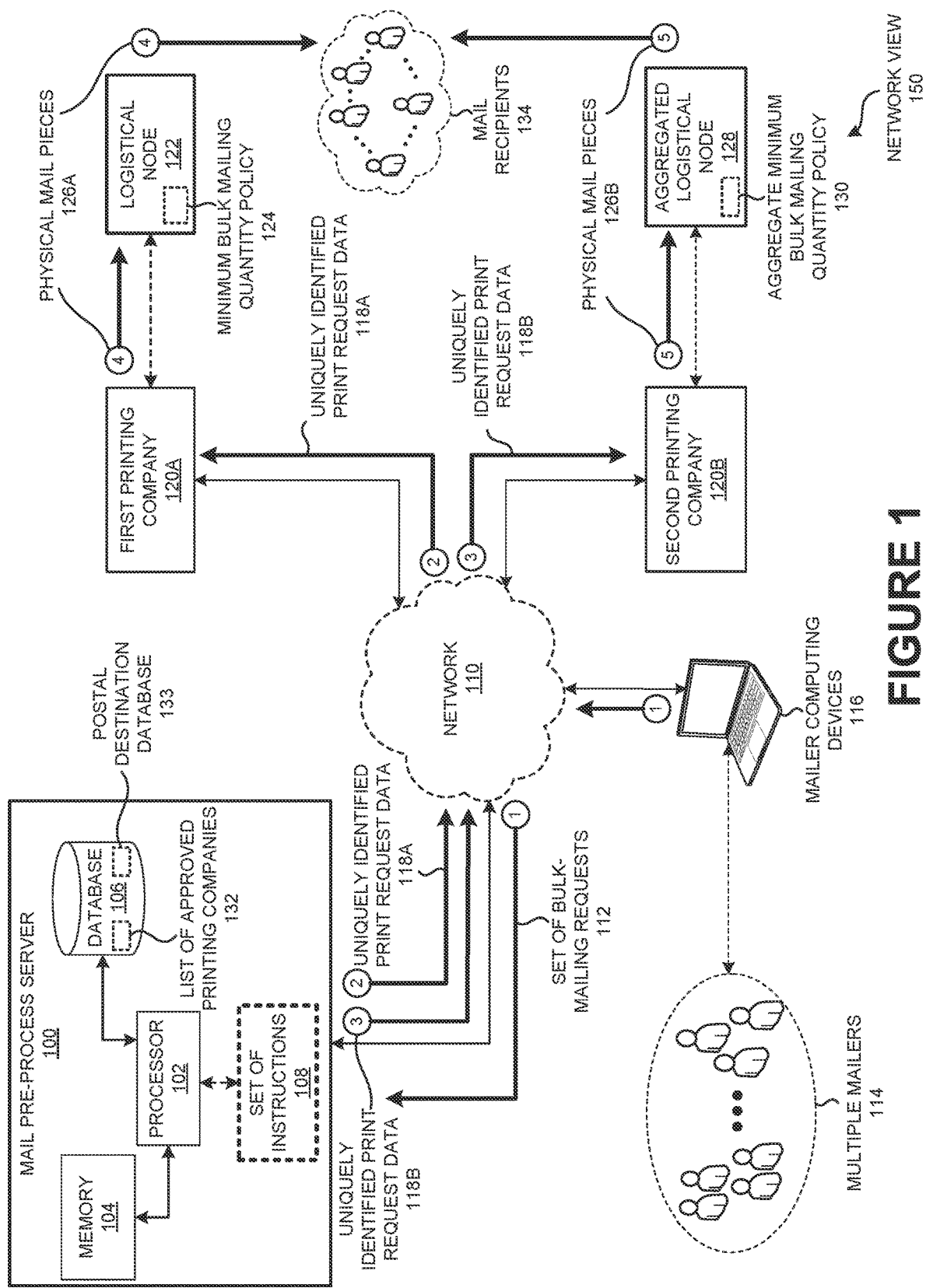
FIG. 1 is a network view illustrating a mail pre-process server receiving a set of bulk-mailing requests from multiple mailers, selecting a printing company to print physical mail pieces and mail to mail recipients at some logistical node near the recipients, according to one embodiment.

Other features of the present embodiments will be apparent from accompanying drawings and from the disclosure that follows.

DETAILED DESCRIPTION

Disclosed are a method and/or a device of a hardware server and technical method to optimize bulk printing of physical items. Although the present embodiments have been described with reference to specific example embodiments, it will be evident that various modifications and changes may be made to these embodiments without departing from the broader spirit and scope of the various embodiments.

In one embodiment, a mail pre-process server 100 includes a processor 102, a memory 104 communicatively coupled with the processor 102, and/or a set of instructions 108 to be executed through the processor 102 using the memory 104 to determine that a set of bulk-mailing requests 112 from multiple mailers 114 are each associated with a digital pre-print mail file 200 associated with destination addresses 204. The set of instructions 108, when executed, determines that a logistical node 122 is associated with certain ones 206 of the destination addresses 204 based on a mail-piece characteristic 202, a distance metric 208, and/or a postal destination database 133.

The set of instructions 108 further determines whether the certain ones 206 of the destination addresses 204 associated with the logistical node 122 satisfies a minimum bulk mailing quantity policy 124 of the logistical node 122. When the minimum bulk mailing quantity policy 124 is satisfied, the set of instructions 108 select a first printing company 120A near to the logistical node 122 based on the mail-piece characteristics 202 and/or an optimization criteria associated with the logistical node 122.

When the minimum bulk mailing quantity policy 124 is unsatisfied, the set of instructions 108 select a second printing company 120B near to an aggregated logistical node 128 associated with the logistical node 122 for which an aggregate minimum bulk mailing quantity policy 130 is satisfied based on the mail-piece characteristics 202 and/or an optimization criteria associated with the aggregated logistical node 128. The aggregated logistical node 128 is an aggregation center for multiple geographically proximate logistical node(s) (e.g., 122 and/or 302). Furthermore, the set of instructions 108 distributes a uniquely identified print request data 118A/118B to the first printing company 120A and/or the second printing company 120B to print a print quantity 400A/400B of physical mail pieces 126A/126B from the digital pre-print mail file(s) 200.

The uniquely identified print request data 118A may define the print quantity 400A associated with a portion 300A of the certain ones 206 of the destination addresses 204 associated with the logistical node 122 near to the first printing company 120A with the portion 300A satisfying the minimum bulk mailing quantity policy 124. Similarly, the uniquely identified print request data 118B may define the print quantity 400B associated with a portion 300B of the certain ones 206 of the destination addresses 204 associated with the aggregated logistical node 128 near to the second printing company 120B with the portion 300B satisfying the aggregate minimum bulk mailing quantity policy 130. Other certain ones 306 of destination addresses 204 associated with other logistical node(s) 302 associated with the aggregated logistical node 128 may each contribute a portion 308 for the aggregated logistical node 128. The print quantity 400B may be associated with the combination of portions 310 from the certain ones 206 and other certain ones 306 such that the print quantity 400B may satisfy the aggregate minimum bulk mailing quantity policy 130.

Each of the first printing company 120A and/or the second printing company 120B may be selected from a list of approved printing companies 132 accessible to the mail pre-process server 100. The uniquely identified print request data 118A/118B may include a processing instruction 500A/500B to process physical mail pieces 126A/126B generated from the portion 300A and/or the combination of portions 310 of the destination addresses 204 based on a processing requirement. The processing may include sorting 602, stamping 604, cancelling 606, packaging 608, and/or printing 610 of a mailing metadata 612 with associated mailing metadata 612 such as a recipient title 614, a recipient name 616, a recipient address 618, a postal code 620, and/or a postal barcode 622.

In addition, the uniquely identified print request data 118A/118B may include a delivery instruction 502A/502B to deliver the physical mail pieces 126A/126B to the logistical node 122 and/or the associated aggregated logistical node 128 based on some delivery requirement(s). Furthermore, the uniquely identified print request data 118A/118B may include a mailing instruction 504A/504B to cause to mail the physical mail pieces 126A/126B at discounted postal rate(s) 700A/700B associated with the minimum bulk mailing quantity policy 124 associated with the logistical node 122 and/or the aggregate minimum bulk mailing quantity policy 130 associated with the aggregated logistical node 128 based on some mailing requirement(s).

The set of instructions 108 may select a first delivery company 810A and/or a second delivery company 810B associated with the logistical node 122 and/or the associated aggregated logistical node 128. Additionally, the set of instructions 108 may distribute a uniquely identified delivery request data 900A/900B to the delivery company 810A/810B. The delivery company 810A/810B may deliver 804 the physical mail pieces 126A/126B to the logistical node 122 and/or the associated aggregated logistical node 128 based on the delivery requirement(s).

The set of instructions 108 may further communicate a set of bulk mailing requests status 1008, comprising status 1000, 1002, 1004 and 1006 of the respective printing company 120A/120B and delivery company 810A/810B, to respective ones of the multiple mailers 114 based on the uniquely identified print request data 118A/118B based on a stage of printing 800, processing 802, delivery 804, and/or mailing 806 processes.

In another embodiment, a mail pre-process server 100 includes a processor 102, a memory 104 communicatively coupled with the processor 102, and/or a set of instructions 108. The set of instructions 108, when executed through the processor 102 using the memory 104, determines that a set of bulk-mailing requests 112 from multiple mailers 114 are each associated with a digital pre-print mail file 200 associated with destination addresses 204. Further, the set of instructions 108 determines that a logistical node 122 is associated with certain ones 206 of the destination addresses 204 based on a mail-piece characteristic 202, a distance metric 208, and/or a postal destination database 133.

The set of instructions 108 waits and determines whether the certain ones 206 of the destination addresses 204 associated with the logistical node 122 satisfies a minimum bulk mailing quantity policy 124 of the logistical node 122. When the minimum bulk mailing quantity policy 124 is satisfied, the set of instructions 108 selects a first printing company 120A near to the logistical node 122 based on the mail-piece characteristics 202 and/or an optimization criteria associated with the logistical node 122. Further, the set of instructions 108 distributes a uniquely identified print request data 118A to the first printing company 120A to print a print quantity 400A of physical mail pieces 126A from the digital pre-print mail file 200.

In yet another embodiment, a method of a mail pre-process server 100 includes determining, using a processor 102 communicatively coupled with a memory 104, that a set of bulk-mailing requests 112 from multiple mailers 114 are each associated with a digital pre-print mail file 200 associated with destination addresses 204. The method determines that a logistical node 122 is associated with certain ones 206 of the destination addresses 204 based on a mail-piece characteristic 202, a distance metric 208, and/or a postal destination database 133. The method further determines whether the certain ones 206 of the destination addresses 204 associated with the logistical node 122 satisfies a minimum bulk mailing quantity policy 124 of the logistical node 122.

When the minimum bulk mailing quantity policy 124 is satisfied, the method selects a first printing company 120A near to the logistical node 122 based on the mail-piece characteristics 202 and/or an optimization criteria associated with the logistical node 122. When the minimum bulk mailing quantity policy 124 is unsatisfied, the method selects a second printing company 120B near to an aggregated logistical node 128 associated with the logistical node 122 for which an aggregate minimum bulk mailing quantity policy 130 is satisfied based on the mail-piece characteristics 202 and/or an optimization criteria associated with the aggregated logistical node 128.

The aggregated logistical node 128 is an aggregation center for multiple geographically proximate logistical node(s) (e.g., 122 and/or 302). Further, the method distributes a uniquely identified print request data 118A/118B to either one of the first printing company 120A and/or the second printing company 120B to print a print quantity 400A/400B of physical mail pieces 126A/126B from the digital pre-print mail file(s) 200.

FIG. 1 is a network view 150 illustrating a mail pre-process server 100 receiving a set of bulk-mailing requests 112 from multiple mailers 114, selecting a printing company 120A/120B to print 800 physical mail pieces 126A/126B and mailing 806 to mail recipients 134 at some logistical node (e.g., 122, 128) near the mail recipients 134, according to one embodiment.

Particularly, FIG. 1 illustrates a mail pre-process server 100, a processor 102, a memory 104, a database 106, a set of instructions 108, a network 110, a set of bulk-mailing requests 112, multiple mailers 114, mailer computing device 116, uniquely identified print request data 118A/118B, a first printing company 120A, a second printing company 120B, a logistical node 122, a minimum bulk mailing quantity policy 124, physical mail pieces 126A/126B, an aggregated logistical node 128, an aggregate minimum bulk mailing quantity policy 130, a list of approved printing companies 132, a postal destination database 133, and mail recipients 134, according to one embodiment.

The mail pre-process server 100 may be a computer and/or a computing device on a network (e.g., network 110) that manages network resources to enable bulk mailing (e.g., set of bulk-mailing requests 112) to be sent by commercial mailers (e.g., banks, credit card companies, utility companies, restaurants, service provider, etc.). In one example embodiment, the mail pre-process server 100 may be a computer program designed for sharing data and software resources to print 800 physical mail pieces 126A/126B from a set of bulk-mailing requests 112 from multiple mailers 114 and enable mailing 806 and final delivery 808 to the associated destination addresses 206 by availing discounts (e.g., discounted postal rate 700A/700B) available for a commercial mailer (e.g., multiple mailers 114), according to one embodiment.

The processor 102 may be a logic circuitry that responds to and processes the basic instructions to drive the mail pre-process server 100 to respond and process the set of bulk-mailing requests 112 from multiple mailers 114. The memory 104 may be any physical device used for storing information temporarily and/or permanently for immediate use by the processor 102 of the mail pre-process server 100, according to one embodiment.

In an example embodiment, the memory 104 may be a volatile memory that stores information on an integrated circuit used by the operating system, software, and hardware of the mail pre-process server 100, according to one embodiment.

The network 110 may be a group of two or more computer systems linked together through communication channels (e.g., wired and/or wireless) to facilitate communication and resource-sharing among a wide range of users (e.g., multiple mailers 114) using network media devices of the mail pre-process server 100, according to one embodiment. The database 106 may be a collection of information that is organized so that it can easily be accessed, managed, and updated by the processor 102 of the mail pre-process server 100, according to one embodiment.

The set of instructions 108 may be a basic set of commands that the microprocessor of the mail pre-process server 100 understands to facilitate printing 800 of physical mail pieces 126A/126B from the set of bulk-mailing requests 112 from multiple mailers 114. The set of instructions 108 may be configured to determine that the set of bulk-mailing requests 112 from multiple mailers 114 are each associated with a digital pre-print mail file(s) 200 associated with destination addresses 204. In addition, the set of instructions 108 may be configured to determine that the logistical node 122 is associated with certain ones 206 of the destination addresses 204, according to one embodiment.

In one more example embodiment, the set of instructions 108 may be configured for the processor 102 to wait for the certain ones 206 of the destination addresses 204 associated with the logistical node 122 to satisfy a minimum bulk mailing quantity policy 124 of the logistical node 122. In yet another example embodiment, the set of instructions 108 may be configured for the processor 102 to avail additional discounts (e.g., discounted postal rate 700A/700B) available for the commercial mailer (e.g., logistics provider, bulk mailer, multiple mailers 114) depending on the postage level for a destination center (e.g., destination addresses 204).

The set of bulk-mailing requests 112 may be solicitation of printing 800 and/or mailing 806 of a group of mails consisting of a large number of identical items (e.g., circulars, fliers, advertisements, physical mail pieces 126) to be sent to individual addresses at a discounted postal rate 700A/700B (e.g., less than first class rates) and paid for in one lot by the multiple mailers 114, according to one embodiment. The multiple mailers 114 may be commercial mailers such as banks, credit card companies, utility companies, restaurants, a man, a woman, a child, etc. seeking to print and send the set of bulk-mailing requests 112 at reduced rates (e.g., discounted postal rate 700A, 700B), according to one embodiment.

The mailer computing device 116 may be a programmable machine responding to a specific set of instructions in a well-defined manner and execute prerecorded instructions used for communication with the mail pre-process server 100 by the multiple mailers 114, according to one embodiment. The mailer computing device 116 may be a desktop computer, a mobile device, a laptop, a tablet, a smart phone, a cellphone, and/or a personal digital assistants (PDAs), etc.

The uniquely identified print request data 118A/118B may be distinctly recognizable details and/or specifics of the print quantity 400A/400B of physical mail pieces 126A/126B from the set of bulk-mailing requests 112 received from the multiple mailers 114, to be printed from the digital pre-print mail file(s) 200 with corresponding destination addresses 204 and recipient information (e.g., mailing metadata 612). The uniquely identified print request data 118A/118B may include the recipient name(s) 616, recipient title(s) 614, recipient address(es) 618, recipient postal codes 620, machine-readable postal barcode(s) 622, pre-stamped date and/or location, and/or pre-canceled date and/or location to allow presorting of the bulk mails, according to one embodiment.

The first printing company 120A and the second printing company 120B may be any establishment (e.g., agency, institution, organization, company, printshop) selected by the mail pre-process server 100 for reproducing text and/or artworks (e.g., images) using master form(s) and/or template(s) obtained from the multiple mailers 114. The first printing company 120A near to the logistical node 122 may be chosen based on the mail-piece characteristics 202 and/or an optimization criteria associated with the logistical node 122 when the minimum bulk mailing quantity policy 124 is satisfied by the certain ones 206 of the destination addresses 204 associated with the logistical node 122, according to one embodiment.

The second printing company 120B may be near to the aggregated logistical node 128 based on the mail-piece characteristics 202 and/or an optimization criteria associated with the aggregated logistical node 128 when the aggregate minimum bulk mailing quantity policy 130 is satisfied, according to one embodiment.

The set of instructions 108 may be configured to select the second printing company 120B for printing a print quantity 400B when the minimum bulk mailing quantity policy 124 is unsatisfied by the certain ones 206 of the destination addresses 204 associated with the logistical node 122, according to one embodiment.

The logistical node 122 may be a post office, a USPS® destination unit, a mail room, a FedEx™ site, a UPS™ site, a transportation node in a transportation network, other logistical sites, etc. It may be a junction and/or a connecting point relating to the process of planning and organizing the movement and/or flow of physical mail pieces 126A/126B, according to one embodiment The minimum bulk mailing quantity policy 124 may be a minimum quantity of physical mail pieces 126A/126B processed (e.g., address checked, presorted, placed in bags/pallets, etc.) and mailed together at the same logistical node 122 while having all corresponding destination addresses 204 associated with the logistical node 122, in order to qualify for a discounted postal rate 700A/700B (e.g., a destination discount such as DDU, DSCF, DADC, DNDC, DFSS, etc.), according to one embodiment.

The minimum bulk mailing quantity policy 124 may also be a deliberate system of principles to guide decisions regarding the optimal quantities of postal mail prepared for mailing at reduced postage rates and achieve rational outcomes. The minimum bulk mailing quantity policy 124 may be a statement of intent, and is implemented as a procedure and/or protocol configured for determining the most advantageous method and/or route of mailing the set of bulk-mailing requests 112 sent by the multiple mailers 114, according to one embodiment.

The physical mail pieces 126A/126B may be the actual number of mails printed by the printing company 120A/120B from the digital pre-print mail file 200 to be sent to the intended recipients (e.g., mail recipients 134), according to one embodiment.

A physical mail piece(s) 126A/126B may be a letter in an envelope (e.g. bank statement, credit card statement, utility bills, DMV/IRS or other government communications, etc), a postcard, a coupon/coupon pack, a flyer, a questionnaire, a magazine, a booklet, a book, a promotional publication, an item in a small box, a grocery item, a merchandise item, a mail-order item, a parcel of arbitrary shape and size, etc., according to one embodiment. The physical mail piece(s) 126A/126B may be a print quantity 400A/400B distributed by the mail pre-process server 100 from the digital pre-print mail file(s) 200 to the first printing company 120A and/or the second printing company 120B for printing 800, according to one embodiment.

The aggregated logistical node 128 may be a junction and/or a connecting point formed by combining several separate logistical node(s) (e.g., 122 and/or 302) from a geographically proximate logistical area, according to one embodiment. The aggregated logistical node 128 may be a USPS® NDC®, SCF®, BMEU®, FSS®, ADC®, a FedEx® Office Ship Center, or a UPS® Store, according to one embodiment.

The aggregate minimum bulk mailing quantity policy 130 may be a minimum quantity of physical mail pieces 126A/126B processed (e.g., address checked, presorted, placed in bags/pallets, etc), mailed together at the same aggregated logistical node 128, and with all corresponding destination addresses 204 associated with the aggregated logistical node 128, in order to qualify for a discounted postal rate 700A/700B (e.g., a destination discount such as DDU, DSCF, DADC, DNDC, DFSS, etc), according to one embodiment.

The aggregate minimum bulk mailing quantity policy 130 may also be a statement of intent, and may be implemented as a procedure and/or protocol, configured for selecting a second printing company 120B near to an aggregated logistical node 128 associated with the logistical node 122 when the minimum bulk mailing quantity policy 124 is unsatisfied, according to one embodiment.

The list of approved printing companies 132 may be the record of printing companies (e.g., first printing company 120A, second printing company 120B) stored in the database 106 accepted as satisfactory by the mail pre-process server 100, according to one embodiment. The list may be updated from time to time when the need arises. The postal destination database 133 may comprise a collection of allowable addresses with associated logistical nodes (e.g., 122 and 302) and aggregated logistical nodes (e.g., 128) that service the allowable addresses. The mail recipients 134 may be a person and/or a thing (e.g., a firm, a P.O. box, an organization, a company, etc.) receiving the physical mail pieces 126A/126B sent by the multiple mailers 114 using the mail pre-process server 100, according to one embodiment.

FIG. 1 illustrates that a mail pre-process server 100 may include a processor 102, a memory 104, and a database 106. The processor 102 may be communicatively coupled with a memory 104 and a database 106. The processor 102 may be coupled with the set of instructions 108. The multiple mailers 114 may use mailer computing device 116 that may be communicatively coupled with the mail pre-process server 100 through the network 110. The first printing company 120A and the second printing company 120B may be communicatively coupled with the mail pre-process server 100 through the network 110. The logistical node 122 may be coupled with the first printing company 120A. The aggregated logistical node 128 may be coupled with the second printing company 120B. The mail recipients 134 may be coupled with the logistical node 122 and the aggregated logistical node 128, according to one embodiment.

FIG. 1 illustrates in circle '1' that a set of bulk-mailing requests 112 may be sent to the mail pre-process server 100 by the multiple mailers 114 through the network 110 using the mailer computing device 116. In circle '2', the uniquely identified print request data 118A may be sent by the mail pre-process server 100 to the first printing company 120A through the network 110. In circle '3', the uniquely identified print request data 118B may be sent by the mail pre-process server 100 to the second printing company 120B through the network 110. In circle '4', the physical mail pieces 126A may be sent to the mail recipients 134 by the logistical node 122 based on minimum bulk mailing quantity policy 124. In circle '5', the physical mail pieces 126B may be sent to the mail recipients 134 by the aggregated logistical node 128 based on aggregate minimum bulk mailing quantity policy 130, according to one embodiment.

Figure 2:
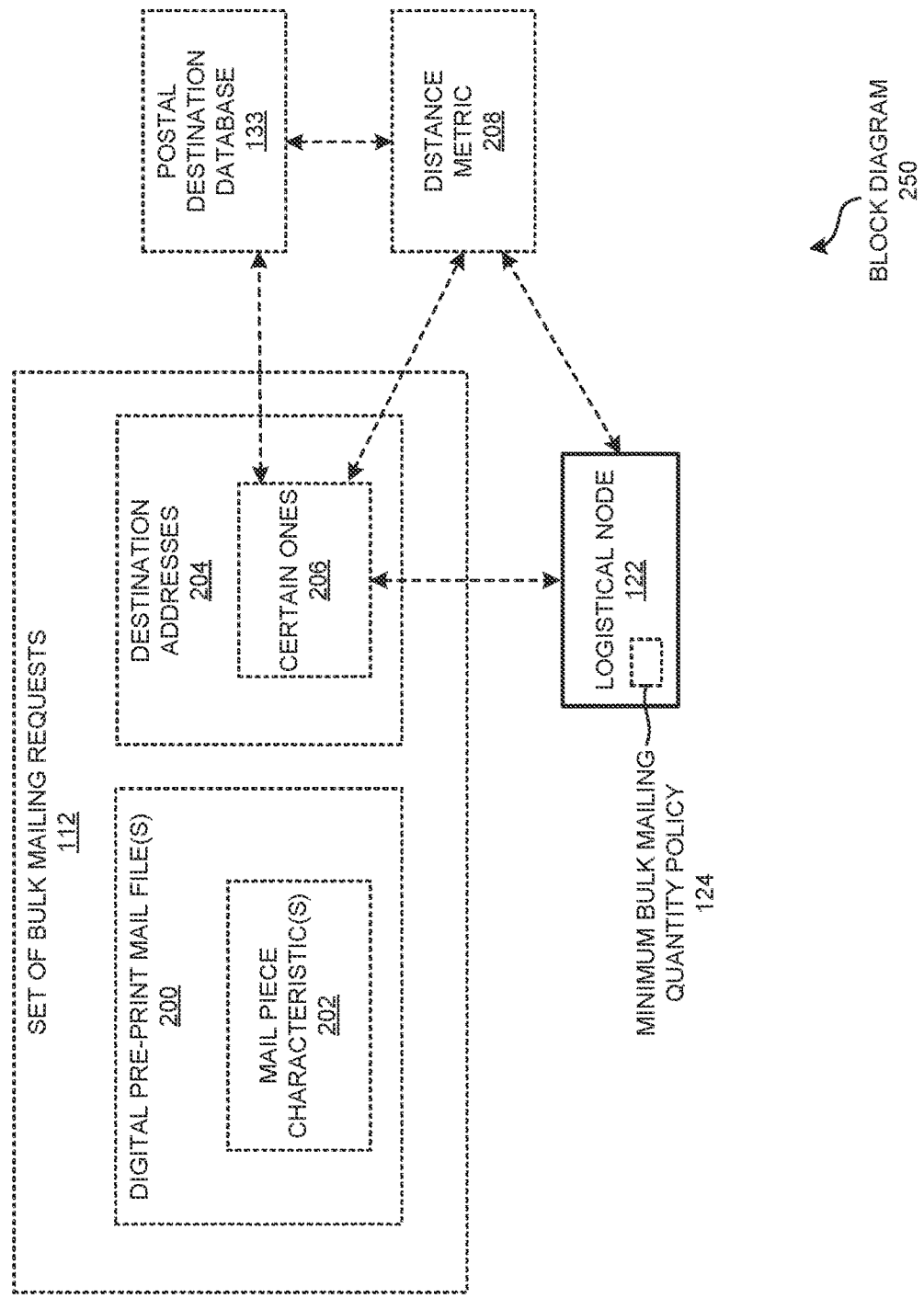
FIG. 2 is a block diagram illustrating the set of bulk mailing requests with associated digital pre-print mail files and destination addresses received by the mail pre-process server of FIG. 1, according to one embodiment.

FIG. 2 is a block diagram 250 of the set of bulk-mailing requests 112 with associated digital pre-print mail file(s) 200 and destination addresses 204 received by the mail pre-process server 100 of FIG. 1, according to one embodiment.

Particularly, FIG. 2 builds on FIG. 1 and further adds a digital pre-print mail file(s) 200, a mail-piece characteristics 202, a destination addresses 204, a certain ones 206, and a distance metric 208.

In an example embodiment, the set of bulk-mailing requests 112 may include the digital pre-print mail file(s) 200 associated with the destination addresses 204. The certain ones of the destination addresses 204 may be associated with the logistical node 122. The certain ones of the destination addresses 204 may be associated with the logistical node 122 according to the postal destination database 133 and/or the distance metric 208.

The digital pre-print mail file(s) 200 may specify the physical mail piece(s) 126A/126B to be printed, with areas on the physical mail pieces 126A/126B designated for insertion of recipient information (e.g., mailing metadata 612). The recipient information may include recipient name 616, recipient title 614, recipient address 618, postal code 620, postal barcode 622, account info, message, images, web page URL, etc. It may contain both text and artwork. It may be in color. It may be in a format used by the printing industry and/or the bulk mailing industry, according to one embodiment.

The digital pre-print mail file(s) 200 may be a Zip™ file, a Tar™ file, a Rar™ file, or other file-archiving file containing more than one files. The digital pre-print mail file 200 may be a resource for storing auxiliary information from the multiple mailers 114 to the mail pre-process server 100, and/or from the mail pre-process server 100 to the printing company 120A/120B. The auxiliary information may include pre-conditions (e.g., mailing date constraint, mailing time constraint, location related constraint, time zone constraint, printing requirement, packaging requirement, handling requirement, flexibility for waiting, etc.) associated with the set of bulk-mailing requests 112, according to one embodiment.

In an example embodiment, the digital pre-print mail file(s) 200 may enable the mail pre-process server 100 to determine the association of the set of bulk-mailing requests 112 from multiple mailers 114 with destination addresses 204, according to one embodiment. In another example embodiment, the digital pre-print mail file 200 may have certain conditions that might allow availing additional discounts (e.g., using discounted postal rate 700A/700B of the mail pre-process server 100) for the multiple mailers 114.

The mail-piece characteristic(s) 202 may be an attribute and/or feature of the most basic component of any mailing. The mail-piece characteristic(s) 202 may include mail type (letters, cards, flats, parcel, etc), weight class (1 oz, 2 oz, 3 oz, 3.3 oz, 3.5 oz, etc), physical measurement (height, length, width, thickness), paper type (offset, cover, text, writing, newsprint, laser, book, index, ledger, Vellum Bristol, coated, uncoated, etc), paper weight (50 lb, 60 lb, 70 lb, 80 lb, 100 lb, etc), paper color (white, pink, canary, green, blue, gray, etc), paper uses (business forms, flyers, books, mailers, etc), machineable/nonmachinable, automation, presorted, first-class mail/standard mail, saturation, address checked, address corrected, profit/nonprofit, carrier route, etc, according to one embodiment.

The mail-piece characteristic(s) 202 may enable determination of association of logistical node 122 with the certain ones 206 of the destination addresses 204. Also, the mail-piece characteristic(s) 202 may enable sorting of mail according to postal address, network distribution center (NDC), sectional center facility SCF, delivery unit DU, carrier route and/or carrier walk sequence and/or putting into appropriate containers, according to one embodiment The destination addresses 204 may be the locations and/or places to which the physical mail pieces 126A/126B from the set of bulk-mailing requests 112 are to be sent by the multiple mailers 114. The destination addresses 204 may include a country name, a state/province name, a city name, a street name, a street number, a floor number, an apartment number or unit number, a P.O. box number, a postal code and/or a bar code. The postal code may be a series of letters and digits. The postal code may be a Postal code with 5 digits, 9 digits, 11 digits and/or other number of digits and letters, according to one embodiment.

The certain ones 206 may be the specific nodes of the destination addresses 204 associated with the logistical node 122 based on mail-piece characteristic(s) 202, a distance metric 208, and/or postal destination database 133.

In one example embodiment, the set of instructions 108 executed through the processor 102 of the mail pre-process server 100 may determine that the set of bulk-mailing requests 112 from multiple mailers 114 are each associated with the digital pre-print mail file(s) 200 associated with destination addresses 204.

The distance metric 208 of the mail pre-process server 100 may be a function that defines a physical distance between two elements (e.g., two destination addresses, two logistical nodes, a destination address and a logistical node, a destination address(es) 204 and an aggregated logistical node 128, a printing company 120A/120B and a logistical node 122, a printing company 120A/120B and an aggregated logistical node 128, and/or a logistical node 122 and an aggregated logistical node 128), according to one embodiment. The distance metric may also be a function that defines a geodesic distance between two elements, according to one embodiment.

The postal destination database 133 of the mail pre-process server 100 may be a collection of valid destination addresses (e.g., destination addresses 204) and the corresponding associated logistical node(s) 122. Such a postal destination database 133 may allow easy look-up. Sometimes a destination address(s) 204 may be invalid such that the corresponding physical mail piece(s) 126A/126B may not be delivered and the corresponding effort wasted. The validity of a destination address(s) 204 may be checked in the postal destination database 133, according to one embodiment.

Figure 3:
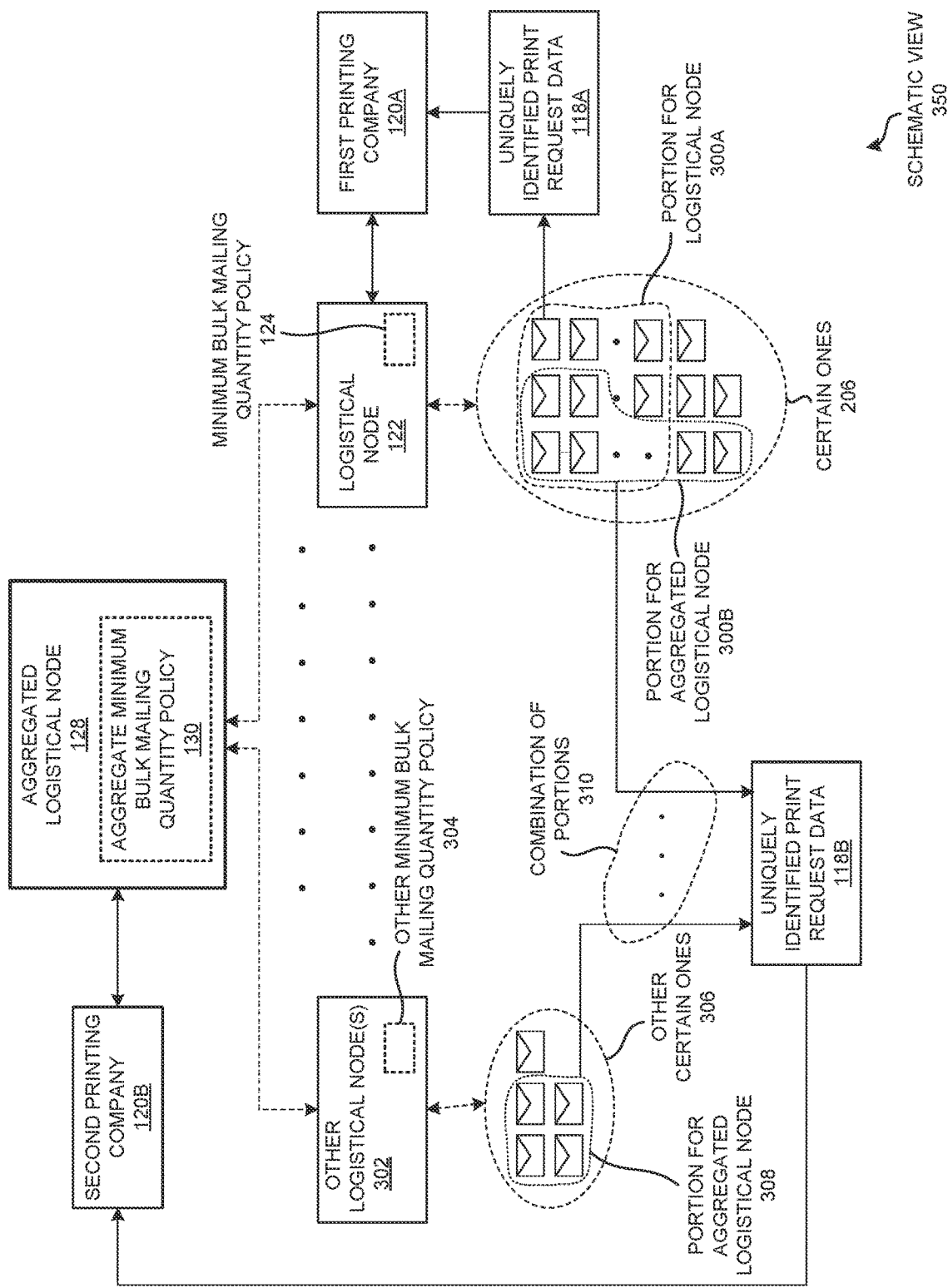
FIG. 3 is a schematic view illustrating portions of destination addresses in the uniquely identified print request data to a first printing company and/or a second printing company of the mail pre-process server of FIG. 1, according to one embodiment.

A destination address(es) 204 may be associated with the nearest logistical node 122 with respect to the distance metric 208, according to one embodiment. A destination address(es) 204 may also be associated with a logistical node 122 according to the postal destination database 133, according to one embodiment. Alternatively, the destination addresses 204 may be associated with more than one logistical node 122, according to one embodiment FIG. 3 is a schematic view 350 illustrating portions 300A/300B/308/310 of destination addresses 204 in the uniquely identified print request data 118A/118B directed to a first printing company 120A and/or a second printing company 120B of the mail pre-process server 100 of FIG. 1, according to one embodiment.

In one example embodiment, the set of instructions 108 may determine whether the certain ones 206 of the destination addresses 204 associated with the logistical node 122 satisfies the minimum bulk mailing quantity policy 124 of the logistical node 122. When the minimum bulk mailing quantity policy 124 is satisfied by the certain ones 206, a portion 300A of the certain ones 206 may be directed to the first printing company 120A in the uniquely identified print request data 118A, with the portion 300A sufficiently large to satisfy the minimum bulk mailing quantity policy 124. The portion 300A may contain a bare minimum amount to satisfy the minimum bulk mailing quantity policy 124.

When the minimum bulk mailing quantity policy 124 of the logistical node 122 is unsatisfied or otherwise, the set of instructions 108 may choose a portion 300B of the certain ones 206 for the aggregated logistical node 128 which may be directed to the second printing company 120B in the uniquely identified print request data 118B, with the portion 300B large enough to satisfy the aggregate minimum bulk mailing quantity policy 130, according to one embodiment.

The portion 300B may not be large enough to satisfy the aggregate minimum bulk mailing quantity policy 130. The portion 300B may be combined with portions (e.g., 308) from other logistical nodes (e.g., 302) to form a print quantity 400B large enough to satisfy the aggregate minimum bulk mailing quantity policy 130. The other logistical node(s) 302 associated with the aggregated logistical node 128 may be associated with other certain ones 306 of destination addresses 204. Some portion 308 of the other certain ones 306 may be chosen for the aggregated logistical node 128. The portions (e.g., 300B and 308) for the aggregated logistical node 128 may be combined. The combination of portions 310 may be large enough to satisfy the aggregate minimum bulk mailing quantity policy 130. The combination of portions 310 may be directed to the second printing company 120B in the uniquely identified print request data 118B, according to one embodiment.

Figure 4:
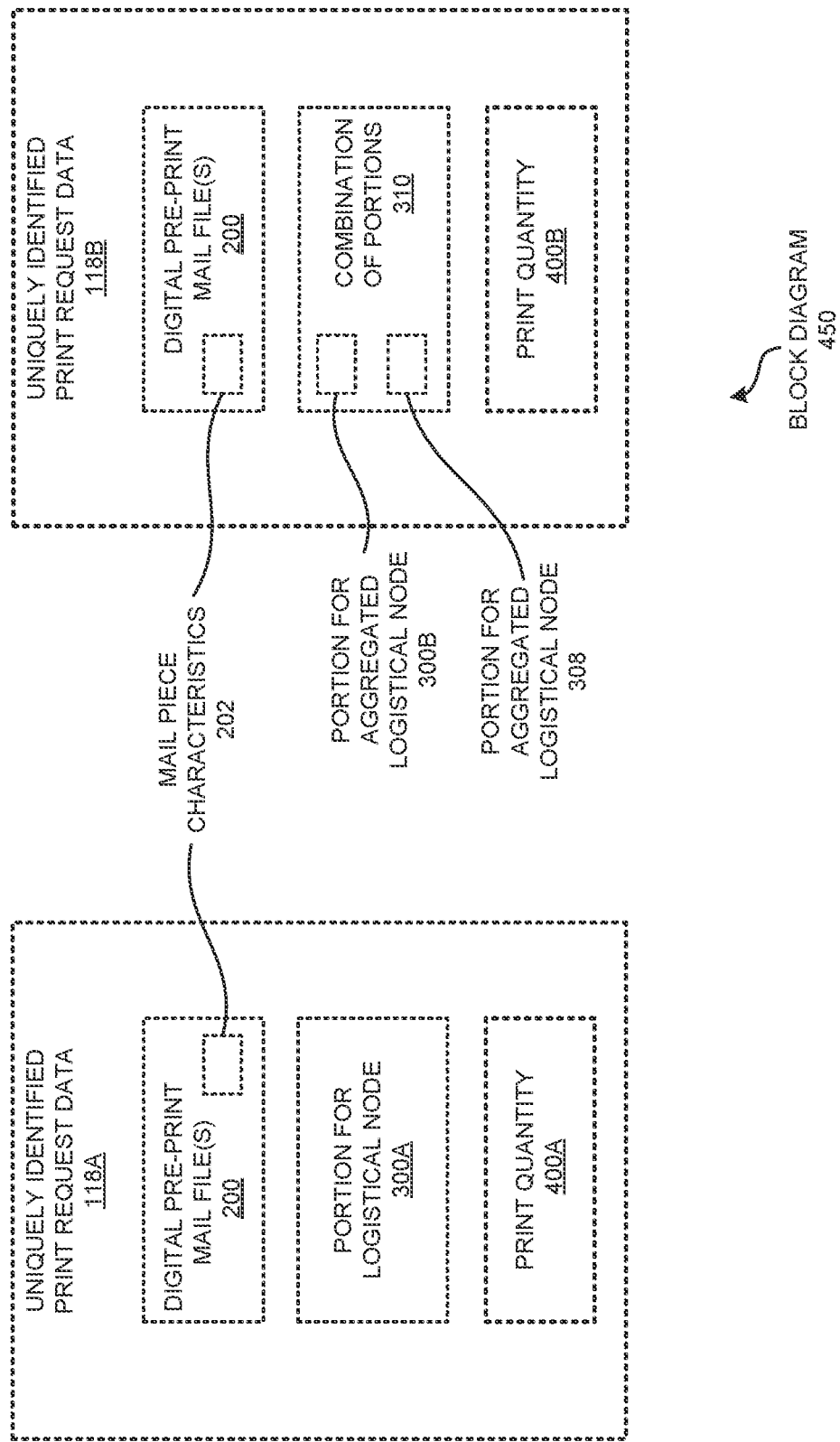
FIG. 4 is a block diagram of the uniquely identified print request data sent by the mail pre-process server of FIG. 1 to the first printing company and/or the second printing company, according to one embodiment.

FIG. 4 is a block diagram 450 of the uniquely identified print request data 118A/118B sent by the mail pre-process server 100 to the first printing company 120A and/or the second printing company 120B, according to one embodiment.

Particularly, FIG. 4 builds on FIGS. 1 through 3, and further adds print quantity 400A and print quantity 400B. The print quantity 400A may be the measure of number of physical mail pieces 126A to be printed by the first printing company 120A using the digital preprint mail file(s) 200. The print quantity 400B may be the measure of physical mail pieces 126B to be printed by the second printing company 120B using the digital preprint mail file(s) 200, according to one embodiment.

The uniquely identified print request data 118A may include the digital pre-print mail file(s) 200 to be printed by the first printing company 120A based on the mail-piece characteristics 202 and an optimization criteria associated with the logistical node 122. The uniquely identified print request data 118A may also define the print quantity 400A to include the portions for logistical node 300A satisfying the minimum bulk mailing quantity policy 124 of the logistical node 122, according to one embodiment.

Further, the uniquely identified print request data 118B may include the digital pre-print mail file(s) 200 to be printed by the second printing company 120B based on the mail-piece characteristics 202 and an optimization criteria associated with the aggregated logistical node 128. The uniquely identified print request data 118B may also define the print quantity 400B to include the portions for aggregated logistical node 300B and the portions for aggregated logistical node 308 with the print quantity 400B satisfying the aggregate minimum bulk mailing quantity policy 130 of the aggregated logistical node 128, according to one embodiment.

Figure 5:
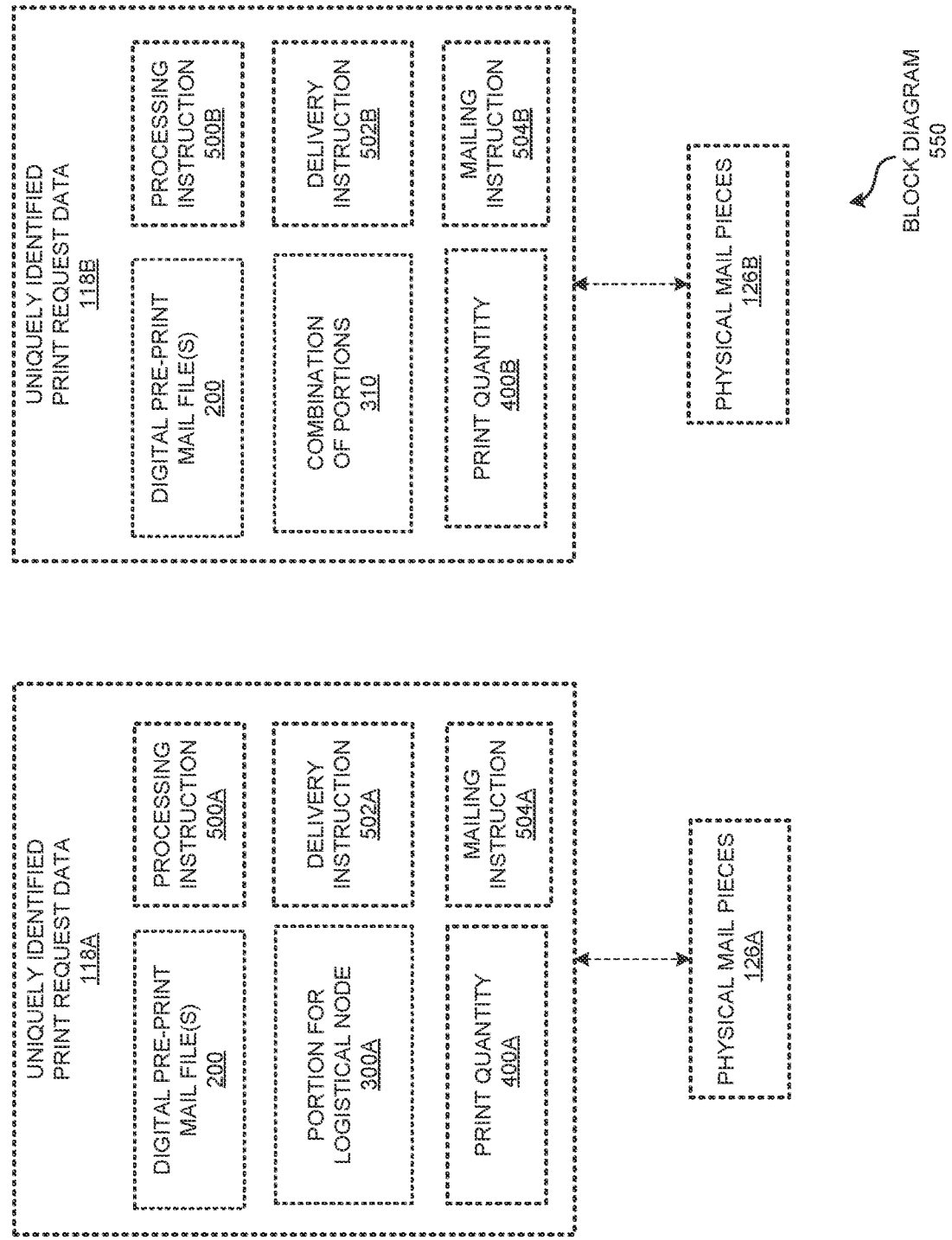
FIG. 5 is a block diagram illustrating the processing instruction, delivery instruction and mailing instruction in the uniquely identified print request data of the mail pre-process server of FIG. 1, according to one embodiment.

FIG. 5 is a block diagram illustrating the processing instruction 500A/500B, delivery instruction 502A/502B, and mailing instruction 504A/504B in the uniquely identified print request data 118A/118B of the mail pre-process server 100 of FIG. 1, according to one embodiment.

Particularly, FIG. 5 builds on FIGS. 1 through 4, and further adds the processing instruction 500A/500B, the delivery instruction 502A/502B, and the mailing instruction 504A/504B in the uniquely identified print request data 118A/118B, in one example embodiment.

The processing instruction 500A/500B may be a directive to print and process the physical mail pieces 126A/126B from the certain ones 206 of the destination addresses 204 based on a processing requirement. The processing may include combining several printed pieces (e.g., coupons, flyers, advertisements) into one physical mail piece (e.g., 126A/126B). The processing instruction 500A/500B may include packaging of the physical mail pieces 126A/126B for delivery and mailing. The processing instruction 500A/500B may enable presorting and placing of physical mail pieces 126A/126B into containers by some order, according to one embodiment. The processing requirement may include certification of mailing list accuracy and/or freshness (e.g., correct postal codes, purging of stale addresses, processing of change-of-address notifications) of the mails, according to one embodiment.

The delivery instruction 502A/502B may be a directive to deliver the physical mail pieces 126A/126B to the intended addressee (e.g., mail recipients 134), according to one embodiment. The delivery instruction 502A/502B may include packaging of physical mail pieces 126A/126B to boxes, bags, pallets, trays, or other containers for delivery and/or mailing. The delivery instruction 502A/502B may include fragile handling. The mailing instruction 504A/504B may be a directive to cause to mail the physical mail pieces 126A at discounted postal rate(s) 700A/700B associated with one of the minimum bulk mailing quantity policy 124 associated with the logistical node 122 and the aggregate minimum bulk mailing quantity policy 130 associated with the aggregated logistical node 128, according to one embodiment.

Figure 6:
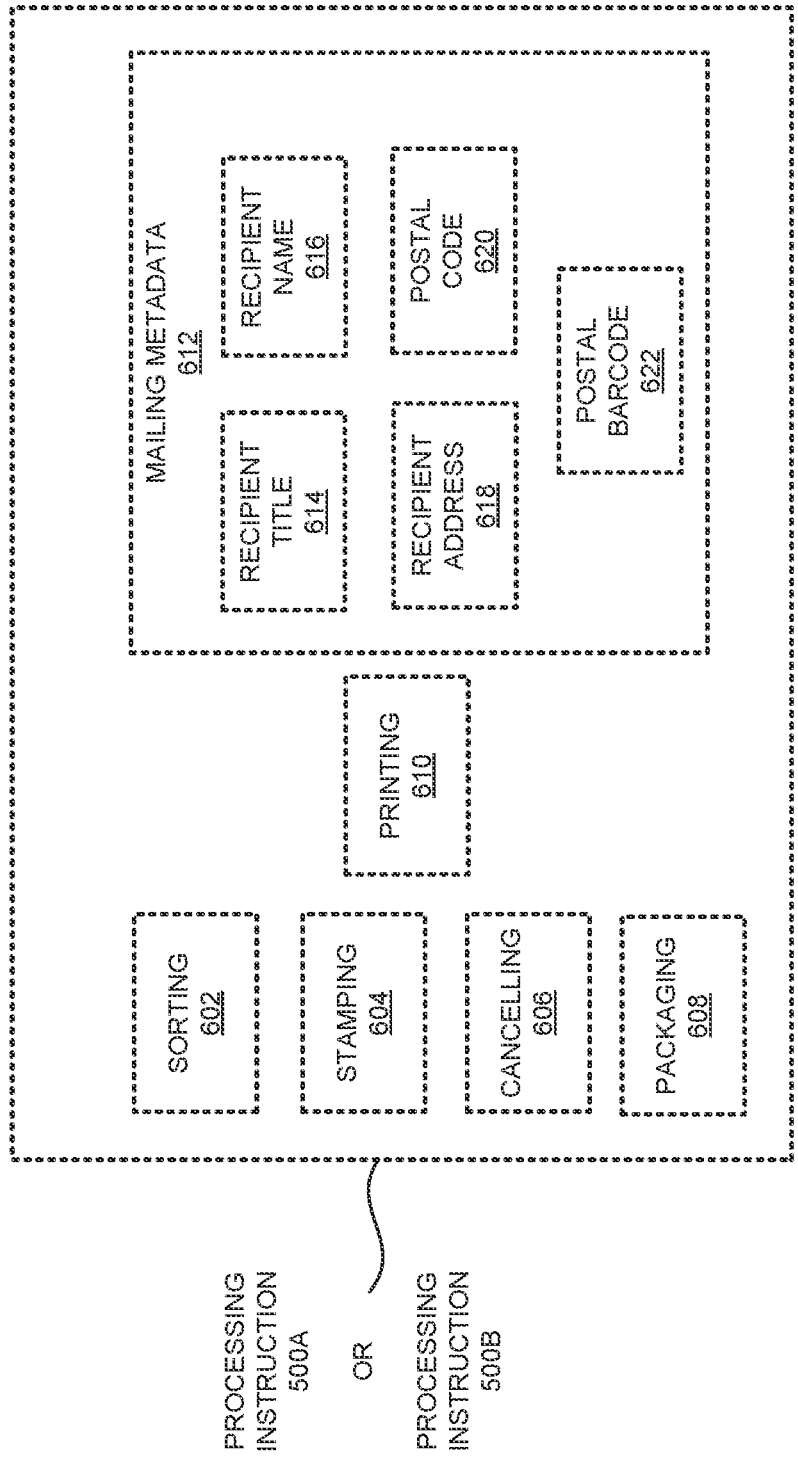
FIG. 6 is an exploded view of the processing instruction in the uniquely identified print request data of the mail pre-process server of FIG. 1, according to one embodiment.

FIG. 6 is an exploded view 650 of the processing instruction 500A/500B in the uniquely identified print request data 118A/118B of the mail pre-process server 100 of FIG. 1, according to one embodiment. Particularly, FIG. 5 builds on FIGS. 1 through 5, and further adds a sorting 602, a stamping 604, a cancelling 606, a packaging 608, a printing 610, a mailing metadata 612, a recipient title 614, a recipient name 616, a recipient address 618, a postal code 620, and a postal barcode 622, according to one embodiment.

The sorting 602 may be the process of placing the physical mail pieces 126A/126B from a collection in some kind of order based on a processing requirement. The sorting 602 may be with respect to the postal code 620 which may contain 5 digits, 9 digits, or more, or a combination of digits and letters (e.g., Canadian postal code with 3 letters and 3 digits). The sorting 602 may be with respect to carrier paths (e.g., in USPS), or with respect to an order in a carrier path (e.g., in USPS). The sorting 602 of the set of bulk-mailing requests 112 may allow for availing additional discounts for physical mail pieces 126A/126B to be applied based on the minimum bulk mailing quantity policy 124 and/or the aggregate minimum bulk mailing quantity policy 130, according to one embodiment.

The stamping 604 may be the process of attaching postage stamps or equivalents on the physical mail pieces 126A/126B. The cancelling 606 may be the process applying postal markings on the postage stamps or postal stationeries on the physical mail pieces to deface the stamp and prevent its re-use, according to one embodiment.

The packaging 608 may be the process of enclosing and/or protecting the physical mail pieces 126A/126B for distribution, mailing, storage, sale, and/or use. The printing 610 may be the process of reproducing text and images using a master form and/or template (e.g., in the digital pre-print mail files 200), according to one embodiment. The mailing metadata 612 may be a set of individualized data associated with the mail recipients 134 that may be printed on the physical mail pieces 126A/126B. The mailing metadata 612 may include a recipient title 614, a recipient name 616, a recipient address 618, a postal code 620, and a postal barcode 622 of the intended addressee (e.g., mail recipients 134), according to one embodiment.

The recipient title 614 may be a prefix or a suffix added to the recipient name. The recipient title 614 may comprise Mr, Mrs, Ms, Miss, Madam, Mx, Master, Hon. The recipient title 614 may reflect job titles such as King, Queen, President, Prince, Princess, Lord, Sir, Emperor, Governor, Senator, Representative, Ambassador, Mayor, Judge, Doctor, Dr, Professor, Inspector, Private, Sergeant, General, Major, Detective, Pope, Father, Pastor, etc. The recipient title 614 may reflect the recipient's role in a family tree such as uncle, aunty, grandpa, grandma, senior, junior, I, II, III, IV, etc. The recipient name 616 may The recipient name 616 may include a first name, a middle name, a last name, according to one embodiment.

The postal code 620 may be a series of letters and/or digits, sometimes including spaces or punctuation, included in a postal address for the purpose of sorting mail. The postal barcode 622 may be an optical machine-readable code in the form a series of parallel lines with varying width and spacing. The postal barcode 622 may also be rectangles, dots, hexagons and other geometric patterns arranged spatially in two dimensions (2D), according to one embodiment.

Figure 7:
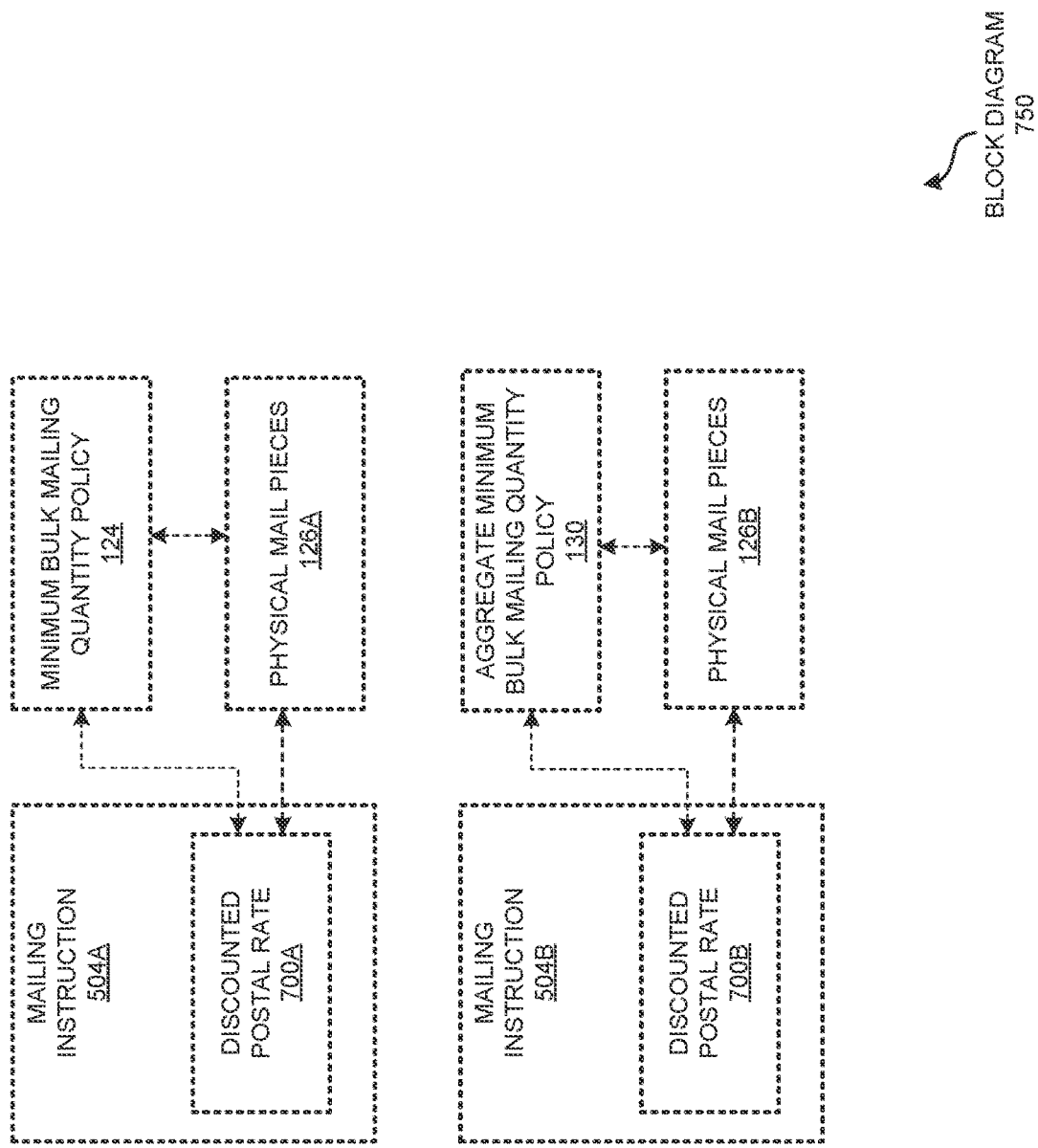
FIG. 7 is a block diagram illustrating the mailing instruction to cause to mail the physical mail pieces at discounted postal rates associated with the minimum bulk mailing quantity policy of the mail pre-process server of FIG. 1, according to one embodiment.

FIG. 7 is a block diagram 750 illustrating the mailing instruction 504A to cause to mail the physical mail pieces 126A/126B at discounted postal rate(s) 700A/700B associated with the minimum bulk mailing quantity policy 124 and/or the aggregate minimum bulk mailing quantity policy 130 of the logistical node 122 and/or aggregated logistical node 128 of mail pre-process server 100 of FIG. 1.

Particularly, FIG. 7 builds on FIGS. 1 through 6, and further adds discounted postal rate(s) 700A and discounted postal rate(s) 700B. The mailing instruction 504A/504B may include directives to apply discounted postal rate(s) 700A/700B to the physical mail pieces 126A/126A wherein the discounted postal rate(s) 700A/700B may be available when the minimum bulk mailing quantity policy 124 of the logistical node 122 and/or the aggregate minimum bulk mailing quantity policy 130 of the aggregated logistical node 128 are satisfied. The discounted postal rate(s) 700A/700B may be the prices charged for mailing the physical mail pieces 126A/126B associated with one of the minimum bulk mailing quantity policy 124 associated with one of the logistical node 122 and/or the aggregate minimum bulk mailing quantity policy 130 associated with one of the aggregated logistical node 128. The discounted postal rate(s) 700A/700B may be based on the mailing requirement 504A/504B, according to one embodiment.

Figure 8:
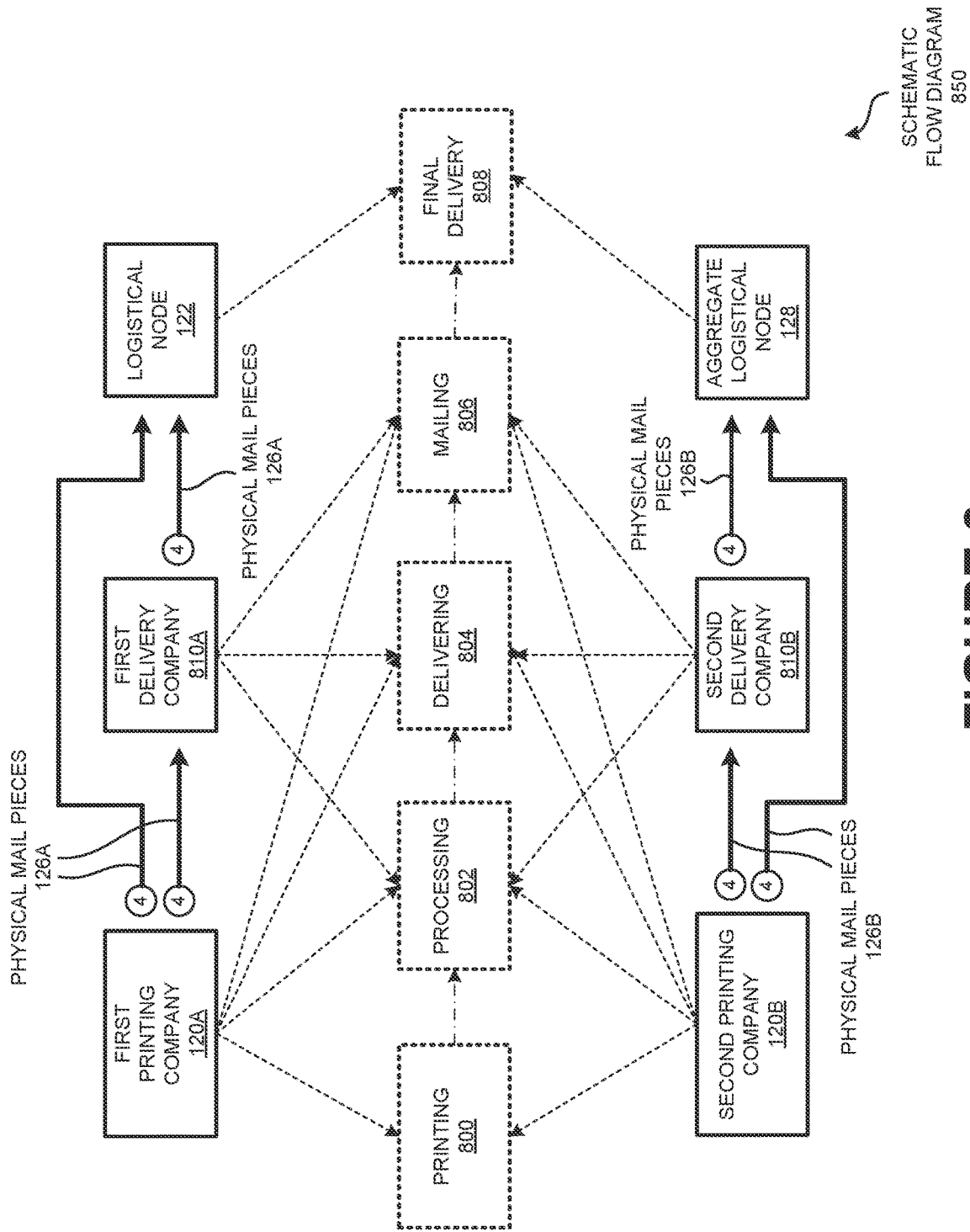
FIG. 8 is a schematic flow diagram illustrating the typical mail flow of printing, processing, delivery, mailing and final delivery of the physical mail pieces with/without a delivery company associated with the logistical node and/or the aggregated logistical node of the mail pre-process server of FIG. 1, according to one embodiment.

FIG. 8 is a schematic flow diagram 850 illustrating the typical mail flow of printing 800, processing 802, delivery 804, mailing 806, and final delivery 808 of the physical mail pieces 126A/126B with/without a delivery company (e.g., 810A/810B) associated with the logistical node 122 and/or the associated aggregated logistical node 128 of the mail pre-process server of FIG. 1, according to one embodiment.

Particularly, FIG. 8 builds on FIGS. 1 through 7 and further adds a printing 800, processing 802, delivering 804, mailing 806, final delivery 808, a first delivery company 810A, and a second delivery company 810B, according to one embodiment. The printing 800 may be the process of reproducing text and images according to some master form(s) and/or template(s) of the digital pre-print mail file(s) 200 of the mail pre-process server 100 according to the processing instructions 500A/500B, according to one embodiment.

The processing 802 may be a series of operations and/or functions executed to prepare the physical mail pieces 126A/126B for delivering 804, mailing 806 and final delivery 808 to the mail recipients 134 according to the processing instructions 500A/500B. The processing 802 may include sorting 602, stamping 604, cancelling 606, packaging 608, and printing 610 of the mailing metadata 612. The processing 802 may enable presorting and placing of the physical mail pieces 126A/126B into containers by some order, according to one embodiment.

The delivering 804 may be the transporting of the physical mail pieces 126A/126B (e.g., a letter, parcel, and/or goods) from the first printing company 120A to the logistical node 122 and/or from the second printing company 120B to the aggregated logistical node 128 according to the delivery instructions 502A/502B, according to one embodiment The mailing 806 may be the dropping and mailing of the physical mail pieces 126A/126B (e.g., a letter, parcel, and/or goods) at the logistical node 122 and/or the aggregated logistical node 128 by the printing company (e.g., first printing company 120A, second printing company 120B) and/or the delivery company (e.g., first delivery company 810A, second delivery company 810B) of the mail pre-process server 100, according to one embodiment.

The final delivery 808 may be the actual handing over of the physical mail pieces 126A/126B to the intended addressee (e.g., mail recipients 134) of the multiple mailers 114 by the postal system (e.g. USPS, FedEx, UPS, etc) associated with the logistical node 122 and the aggregated logistical node 128, according to one embodiment.

The delivery company 810 may be any entity (e.g., a firm, an organization, and/or an establishment) associated with one of the logistical node 122 and/or the associated aggregated logistical node 128 designated for transporting the physical mail pieces 126A/126B to the logistical node 122 and/or the aggregated logistical node 128, according to one embodiment.

In one example embodiment, in circle '4', the typical mail flow may include the physical mail pieces 126A/126B being transported from the printing company 120A/120B to the logistical node 122 and/or the aggregated logistical node 128, by either the printing company 120A/120B or a dedicated delivery company 810A/810B. While the printing 800 in done at the printing company 120A/120B, the processing 802, delivering 804, and mailing 806 of the physical mail pieces 126A may be done by either the printing company 120A/120B or the delivery company 810A/810B.

Figure 9:
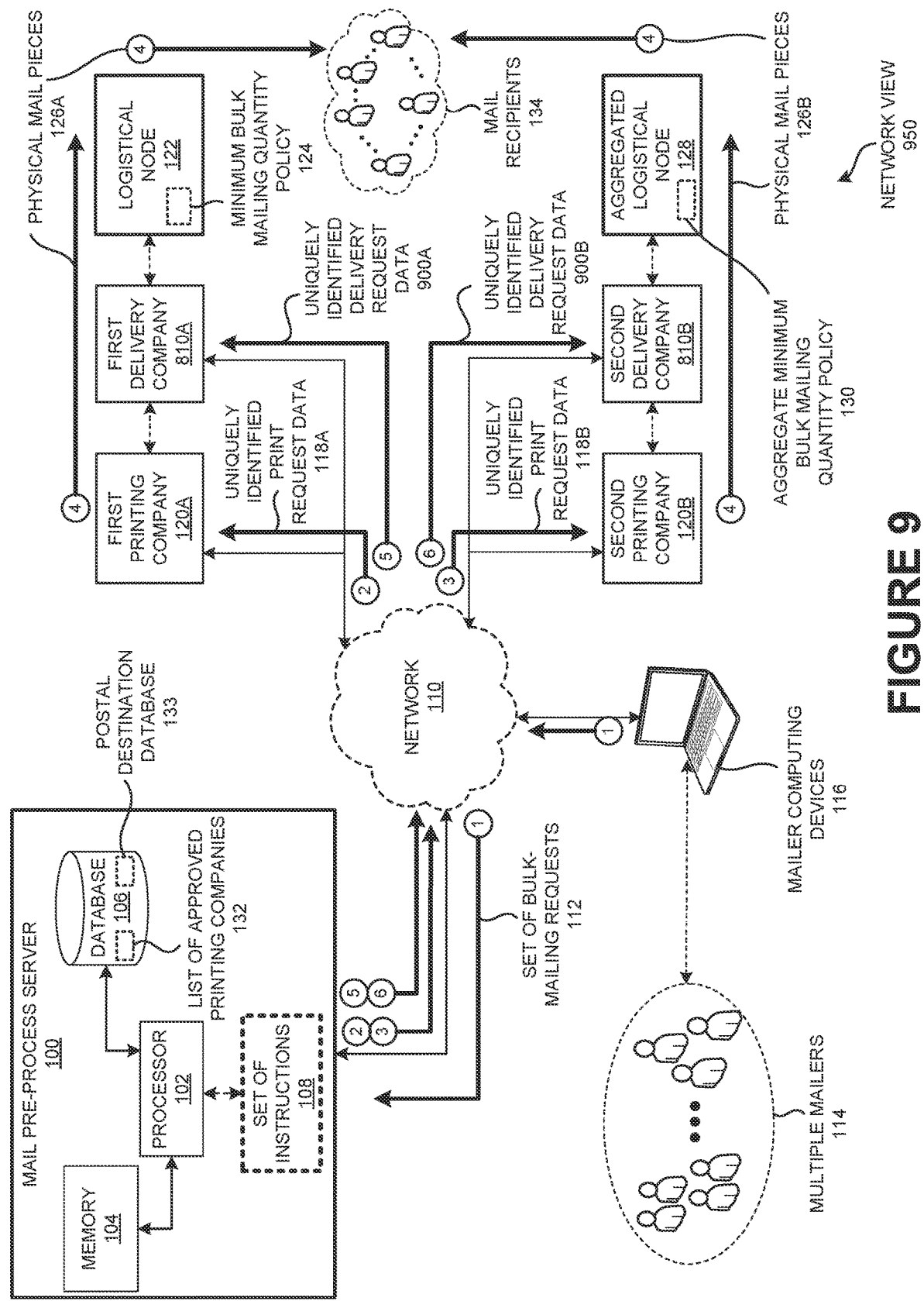
FIG. 9 is a network view illustrating the selection of a delivery company for delivering the physical mail pieces based on a uniquely identified delivery data received from the mail pre-process server 100, according to one embodiment.

FIG. 9 is a network view 950 illustrating the selection of a delivery company 810A/810B for delivering 804 the physical mail pieces 126A/126B based on a uniquely identified delivery request data 900A/900B received from the mail pre-process server 100, according to one embodiment.

Particularly, FIG. 9 builds on FIGS. 1 through 8, and further adds uniquely identified delivery request data 900A/900B. The uniquely identified delivery request data 900A/900B may be the distribution of the delivery information to the delivery company 810A/810B. The delivery information may include the details of the delivery source (e.g., the printing companies 120A/120B), the details of delivery destination (e.g., the logistical node 122, the aggregated logistical node 128), the details of the payload to be delivered (e.g., the print quantity 400A/400B of physical mail pieces 126A/126B to be delivered, and the mail piece characteristics 202.)

In circle '1', a set of bulk-mailing requests 112 may be sent to the mail pre-process server 100 by the multiple mailers 114 through the network 110 using the mailer computing device 116. In circle '2', the uniquely identified print request data 118A may be sent by the mail pre-process server 100 to the first printing company 120A through the network 110. In circle '3', the uniquely identified print request data 118B may be sent by the mail pre-process server 100 to the second printing company 120B through the network 110, according to one embodiment.

In circle '4', the physical mail pieces 126A/126B may be delivered 804 from the printing company 120A/120B to the logistical node 122 and/or the aggregated logistical node 128 according to a delivery instruction 502A/502B and mailed 806 according to some mailing instruction 504A/504B followed by the final delivery 808 to the mail recipients 134, according to one embodiment. In circle '5', the uniquely identified delivery request data 900A may be sent by the mail pre-process server 100 to the first delivery company 810A through the network 110. In circle '6', the uniquely identified delivery data 900B may be sent by the mail pre-process server 100 to the second delivery company 810B through the network 110, according to one embodiment.

Figure 10:
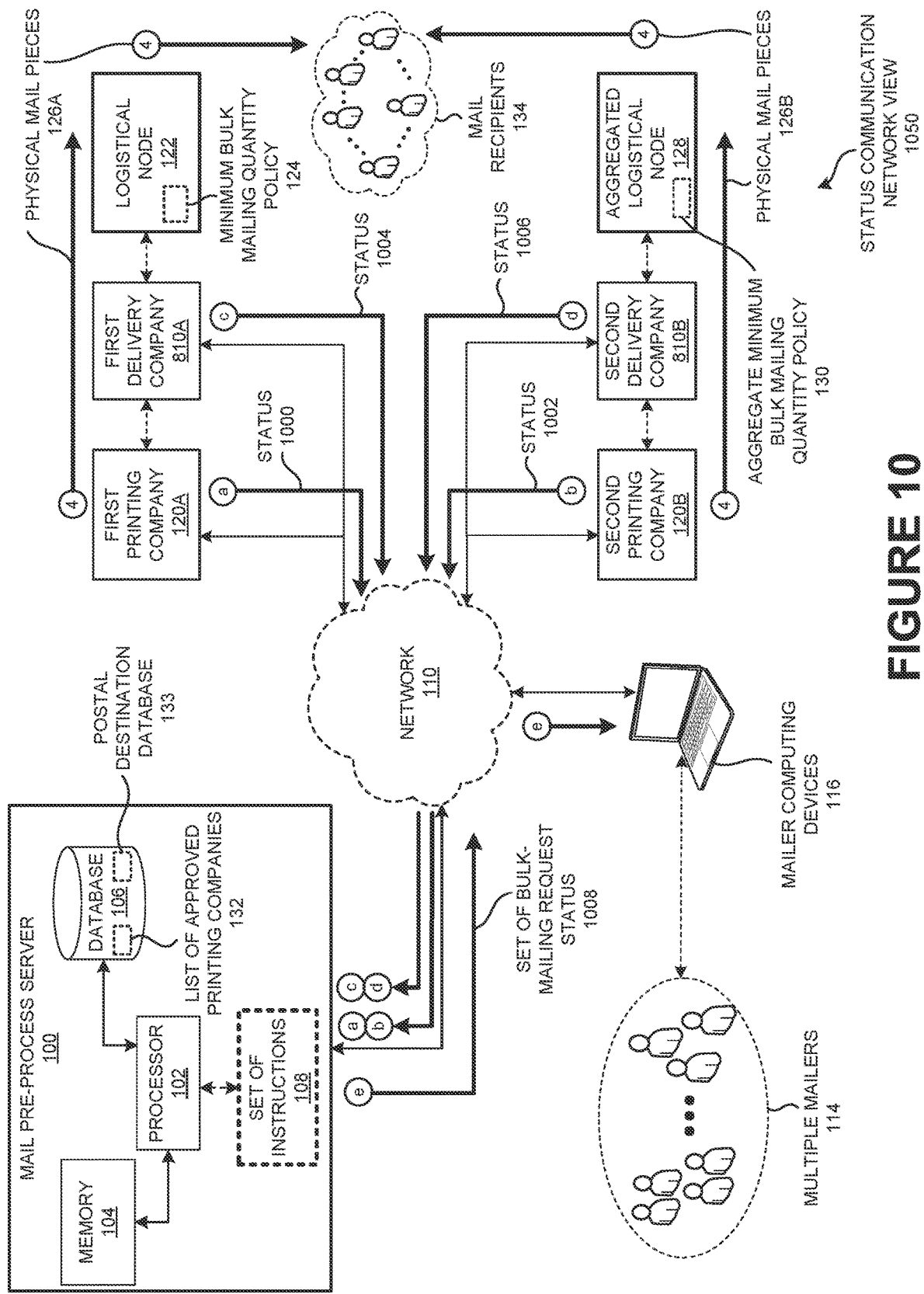
FIG. 10 is a status communication network view of the mail pre-process server of FIG. 1 illustrating the communication of a set of bulk mailing request status to respective ones of the multiple mailers, according to one embodiment.

FIG. 10 is a status communication network view 1050 of the mail pre-process server 100 of FIG. 1 illustrating the communication of a set of bulk-mailing request status 1008 to respective ones of the multiple mailers 114, according to one embodiment. Particularly, FIG. 10 builds on FIGS. 1 through 9, and further adds status 1000 and 1002 from the printing company 120A and 120B, status 1004 and 1006 from the delivery company 810A/810B and a set of bulk mailing requests status 1008 to the corresponding ones of the multiple mailers 134, according to one embodiment.

The status 1000, 1002, 1004, and 1006 may be the present situation and/or condition of the set of bulk-mailing requests 112 at a particular point of time. The set of bulk mailing requests status 1008 may be the process of communicating the status 1000, 1002, 1004, and 1006 of the set of bulk-mailing requests 112 to respective ones of the multiple mailers 114 based on the uniquely identified print request data 118A/118B. The set of bulk mailing requests status 1008 may be based on a stage of printing 800, processing 802, delivery 804, and mailing 806, according to one embodiment.

In circle 'a', the first printing company 120A may send the status 1000 of the physical mail pieces 126A to the mail pre-process server 100 through the network 110. In circle 'b', the second printing company 120B may send the status 1002 of the physical mail pieces 126B to the mail pre-process server 100 through the network 110. In circle 'c', the first delivery company 810A may send the status 1004 of the physical mail pieces 126A to the mail pre-process server 100 through the network 110. In circle 'd', the second delivery company 810B may send the status 1006 of the physical mail pieces 126B to the mail pre-process server 100 through the network 110. In circle 'e', the mail pre-process server 100 may consolidate and send the set of bulk mailing request status 1008 to the respective ones (e.g., multiple mailers 114) through the network 110, according to one embodiment.

Figure 11A:
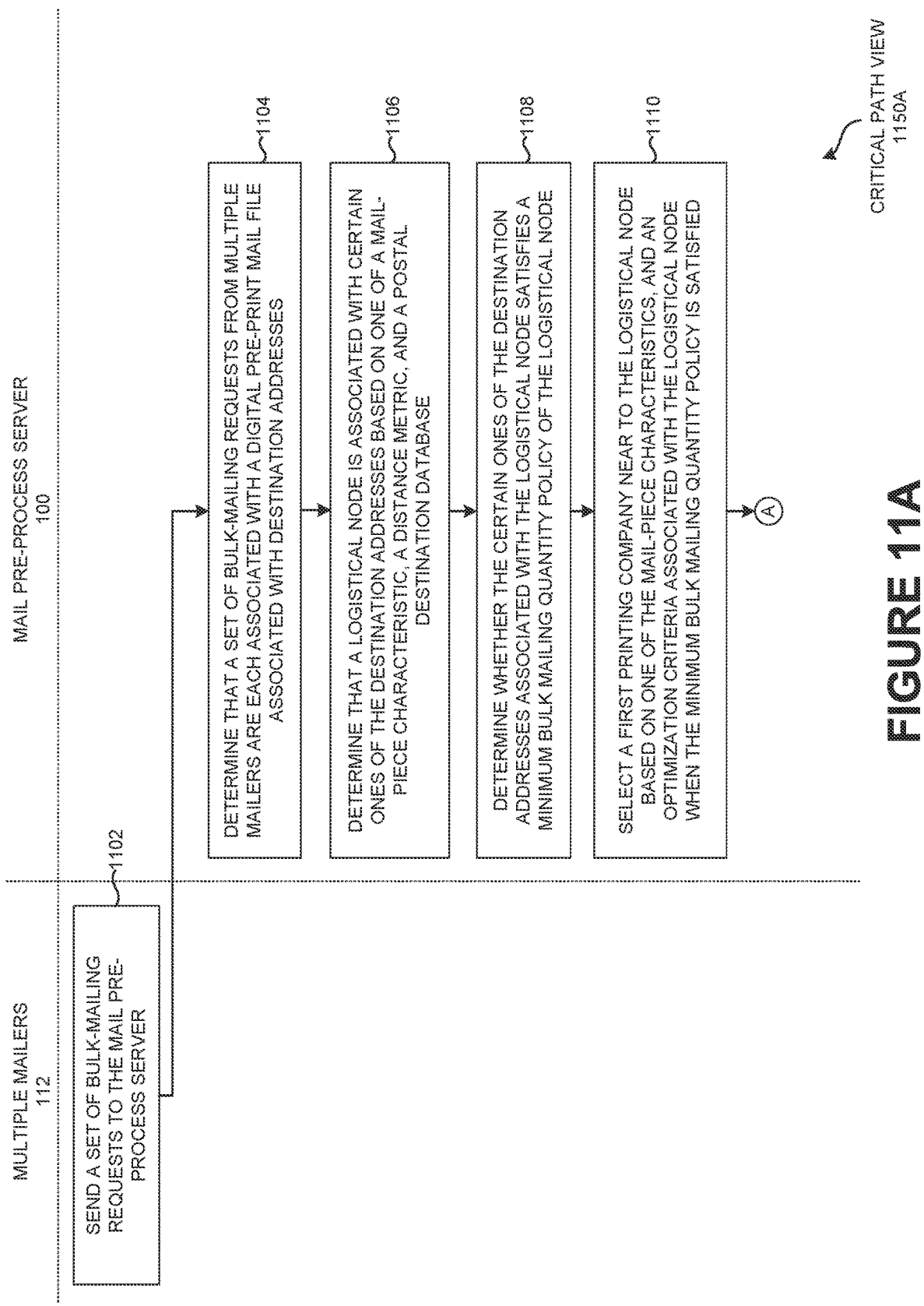
FIG. 11A is a critical path view illustrating a flow based on time in which critical operations of the mail pre-process server of FIG. 1 are established, according to one embodiment.

FIG. 11A is a critical path view 1150A illustrating a flow based on time in which critical operations of the mail pre-process server 100 of FIG. 1 are established, according to one embodiment. In operation 1102, multiple mailers 114 may send a set of bulk-mailing requests 112 to the mail pre-process server 100. In operation 1104, the mail pre-process server 100 may determine that a set of bulk-mailing requests 112 from multiple mailers 114 are each associated with a digital pre-print mail file 200 associated with destination addresses 204, according to one embodiment.

In operation 1106, the mail pre-process server 100 may determine that a logistical node 122 is associated with certain ones 206 of the destination addresses 204 based on one of a mail-piece characteristics 202, a distance metric 208, and a postal destination database 133, according to one embodiment. In operation 1108, the mail pre-process server 100 may determine whether the certain ones 206 of the destination addresses 204 associated with the logistical node 122 satisfies a minimum bulk mailing quantity policy 124 of the logistical node 122, according to one embodiment.

In operation 1110, the mail pre-process server 100 may select a first printing company 120A near to the logistical node 122 based on one of the mail-piece characteristic(s) 202, and/or an optimization criteria associated with the logistical node 122 when the minimum bulk mailing quantity policy 124 is satisfied, according to one embodiment.

Figure 11B:
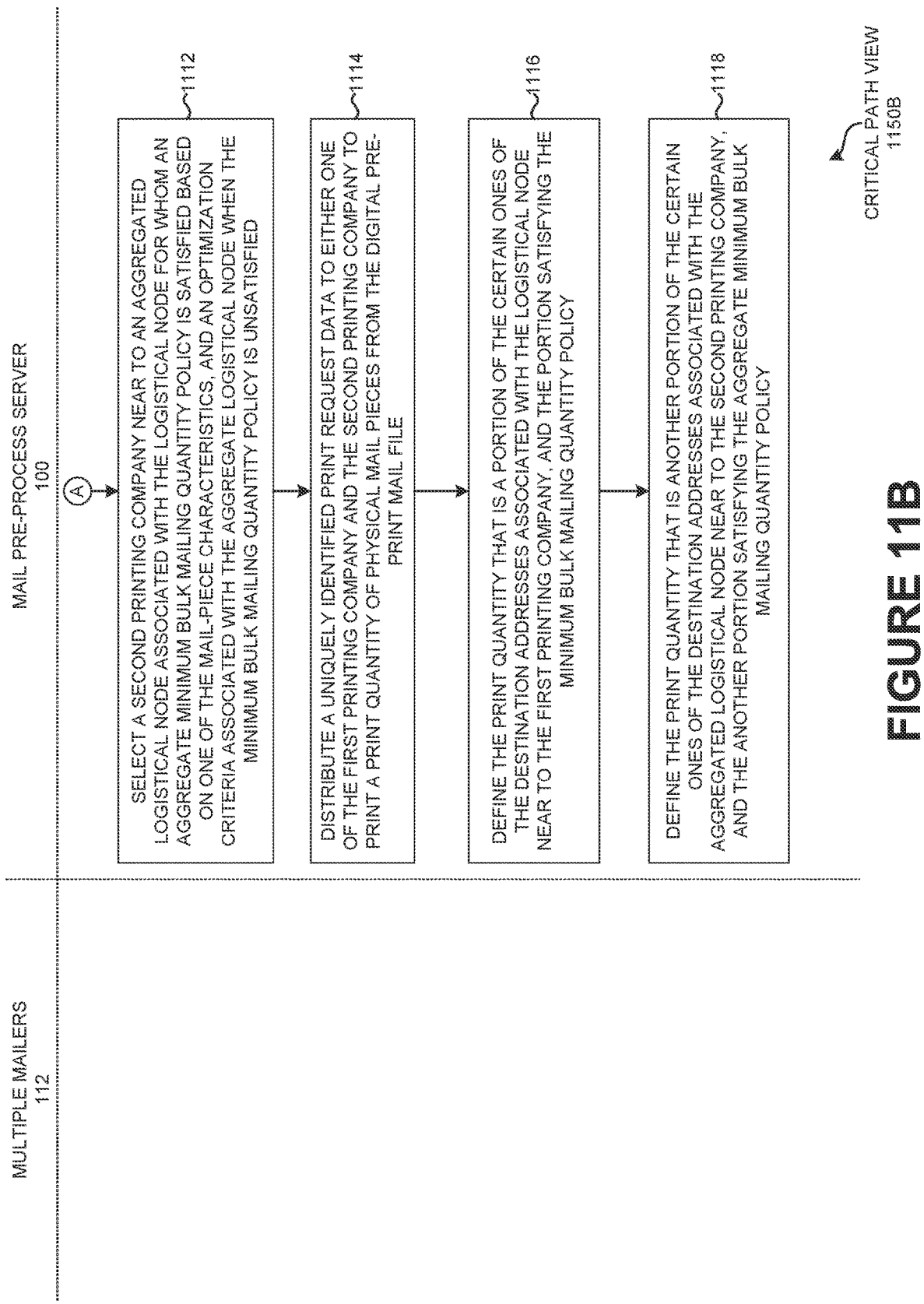
FIG. 11B is a continuation of the critical path view of FIG. 11A of the mail pre-process server of FIG. 1, according to one embodiment.

FIG. 11B is a critical path view 1150B which is a continuation of the critical path view 1150A of FIG. 11A of the mail pre-process server 100 of FIG. 1, according to one embodiment. In operation 1112, the mail pre-process server 100 may select a second printing company 120B near to an aggregated logistical node 128 associated with the logistical node 122 for which an aggregate minimum bulk mailing quantity policy 130 is satisfied based on one of the mail-piece characteristic(s) 202, and/or an optimization criteria associated with the aggregated logistical node 128 when the minimum bulk mailing quantity policy 124 is unsatisfied, according to one embodiment.

In operation 1114, the mail pre-process server 100 may distribute a uniquely identified print request data 118A/118B to either one of the first printing company 120A and/or the second printing company 120B to print a print quantity 400A/400B of physical mail pieces 126A/126B from the digital pre-print mail file(s) 200. In operation 1116, the uniquely identified print request data 118A may define the print quantity 400A that is a portion 300A of the certain ones 206 of the destination addresses 204 associated with the logistical node 122 near to the first printing company 120A, with the portion 300A satisfying the minimum bulk mailing quantity policy 124, according to one embodiment.

In operation 1118, the uniquely identified print request data 118B may define the print quantity 400B that is another portion 300B of the certain ones 206 of the destination addresses 204 associated with the aggregated logistical node 128 near to the second printing company 120B, with the another portion 300B satisfying the aggregate minimum bulk mailing quantity policy 130, according to one embodiment.

Figure 12:
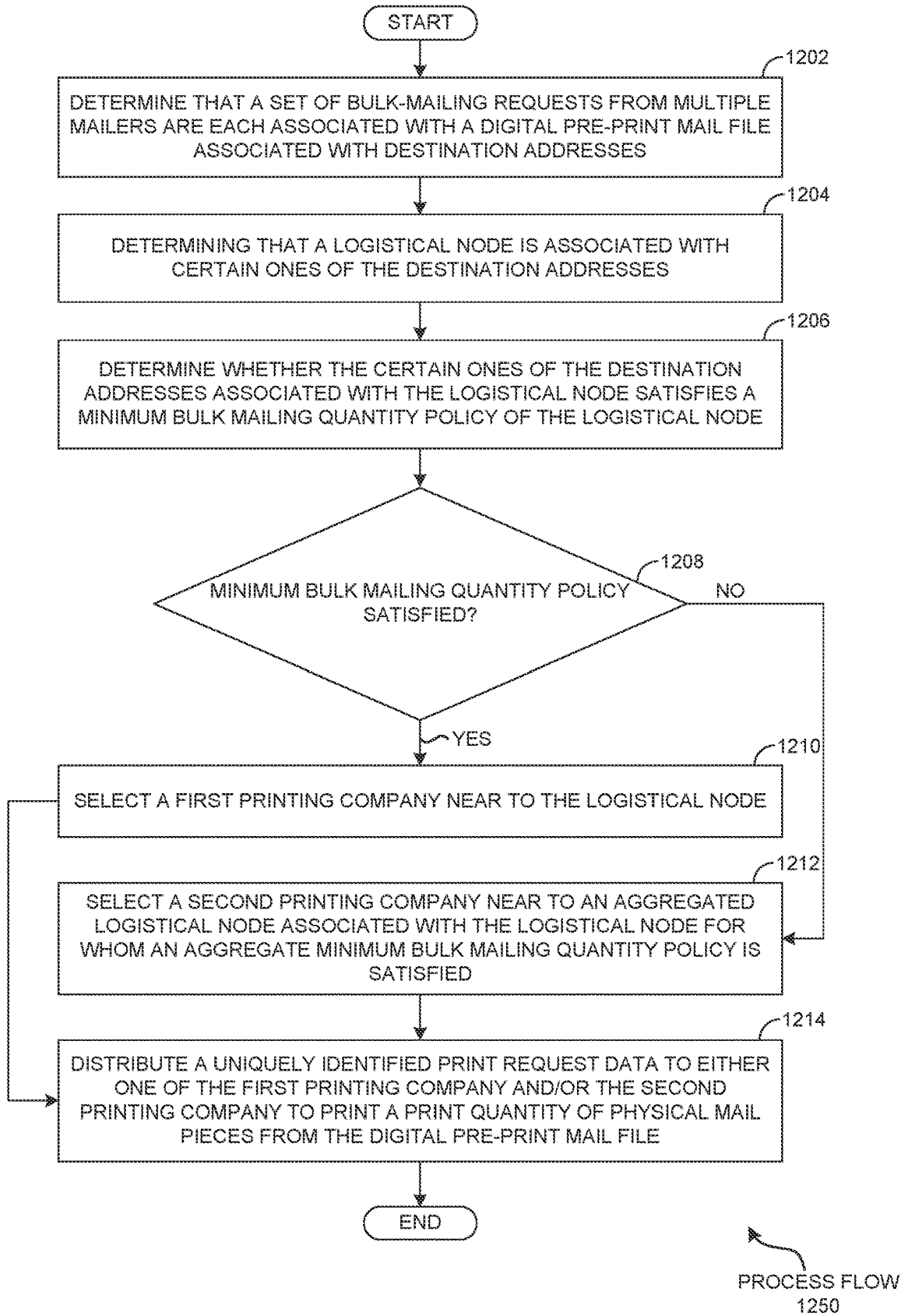
FIG. 12 illustrates a process flow to select a printing company for the set of bulk-mailing requests from multiple mailers based on the satisfaction of the minimum bulk mailing quantity policy of the logistical node of the mail pre-process server of FIG. 1, according to one embodiment.

FIG. 12 illustrates a process flow to select a printing company 120A/120B for the set of bulk-mailing requests 112 from multiple mailers 114 based on the satisfaction of the minimum bulk mailing quantity policy 124 of the logistical node 122 of the mail pre-process server 100 of FIG. 1, according to one embodiment.

In operation 1202, the set of instructions 108 executed through the processor 102 of the mail pre-process server 100 using the memory 104 may determine that a set of bulk-mailing requests 112 from multiple mailers 114 are each associated with a digital pre-print mail file(s) 200 associated with the destination addresses 204, according to one embodiment.

In operation 1204, the set of instructions 108 may determine that a logistical node 122 is associated with certain ones 206 of the destination addresses 204. In operation 1206, the set of instructions 108 may further determine whether the certain ones 206 of the destination addresses 204 associated with the logistical node 122 satisfies a minimum bulk mailing quantity policy 124 of the logistical node 122, according to one embodiment.

In operation 1208, the set of instructions 108 may determine whether the minimum bulk mailing quantity policy 124 is satisfied. If the minimum bulk mailing quantity policy 124 is satisfied in operation 1208, the set of instructions 108 may select in operation 1210 a first printing company 120A near to the logistical node 122. If the minimum bulk mailing quantity policy 124 is unsatisfied in operation 1208, the set of instructions 108 may select in operation 1212 a second printing company 120B near to an aggregated logistical node 128 associated with the logistical node 122 for which an aggregate minimum bulk mailing quantity policy 130 is satisfied, according to one embodiment.

In operation 1214, the set of instructions 108 may distribute a uniquely identified print request data 118A/118B to the first printing company 120A and/or the second printing company 120B to print a print quantity 400A/400B of physical mail pieces 126A/126B from the digital pre-print mail file(s) 200, according to one embodiment.

Figure 13:
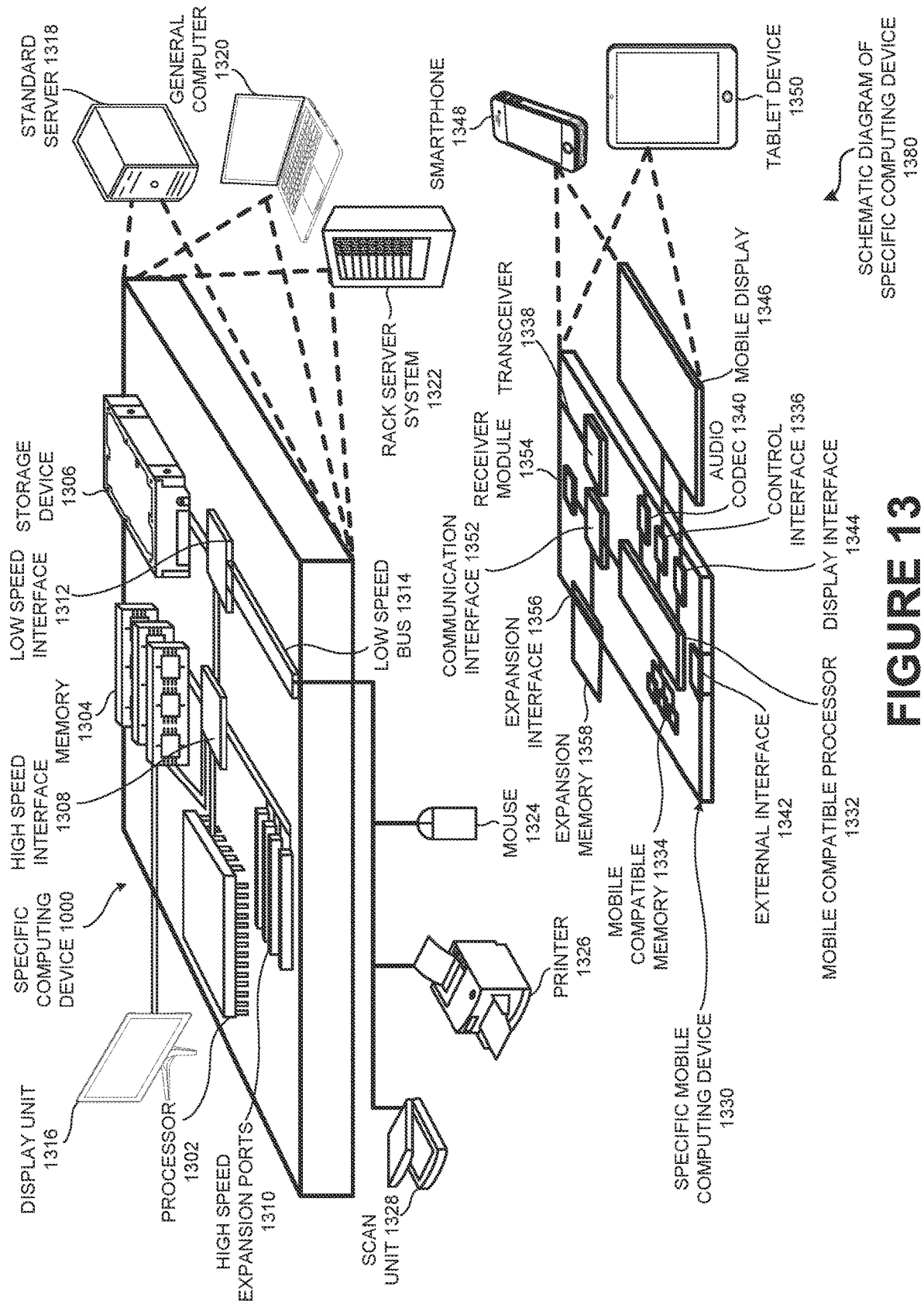
FIG. 13 is a schematic diagram of exemplary data processing devices that can be used to implement the methods and systems disclosed herein, according to one embodiment.

FIG. 13 is a schematic diagram of specific computing device 1380 and a specific mobile computing device 1330 that can be used to perform and/or implement any of the embodiments disclosed herein. In one or more embodiments, the mail pre-process server 100 and/or the mailer computing device(s) 116 illustrated in FIG. 1 may be the specific computing device 1300.

The specific computing device 1300 may represent various forms of digital computers, such as laptops, desktops, workstations, personal digital assistants, servers, blade servers, mainframes, and/or other appropriate computers. The specific mobile computing device 1330 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 1300 may include a processor 1302, a memory 1304, a storage device 1306, a high speed interface 1308 coupled to the memory 1304 and a plurality of high speed expansion ports 1310, and a low speed interface 1312 coupled to a low speed bus 1314 and a storage device 1306. In one embodiment, each of the components heretofore may be inter-coupled using various buses, and may be mounted on a common motherboard and/or in other manners as appropriate. The processor 1302 may process instructions for execution in the specific computing device 1300, including instructions stored in the memory 1304 and/or on the storage device 1306 to display a graphical information for a GUI on an external input/output device, such as a display unit 1316 coupled to the high speed interface 1308, according to one embodiment.

In other embodiments, multiple processors and/or multiple buses may be used, as appropriate, along with multiple memories and/or types of memory. Also, a plurality of computing device 1300 may be coupled with, with each device providing portions of the necessary operations (e.g., as a server bank, a group of blade servers, and/or a multi-processor system).

The memory 1304 may be coupled to the specific computing device 1300. In one embodiment, the memory 1304 may be a volatile memory. In another embodiment, the memory 1304 may be a non-volatile memory. The memory 1304 may also be another form of computer-readable medium, such as a magnetic and/or an optical disk. The storage device 1306 may be capable of providing mass storage for the specific computing device 1300. In one embodiment, the storage device 1306 may be includes a floppy disk device, a hard disk device, an optical disk device, a tape device, a flash memory and/or other similar solid state memory device. In another embodiment, the storage device 1306 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 1304, the storage device 1306, a memory coupled to the processor 1302, and/or a propagated signal.

The high speed interface 1308 may manage bandwidth-intensive operations for the specific computing device 1300, while the low speed interface 1312 may manage lower bandwidth-intensive operations. Such allocation of functions is exemplary only. In one embodiment, the high speed interface 1308 may be coupled to the memory 1304, the display unit 1316 (e.g., through a graphics processor and/or an accelerator), and to the plurality of high speed expansion ports 1310, which may accept various expansion cards.

In the embodiment, the low speed interface 1312 may be coupled to the storage device 1306 and the low speed bus 1314. The low speed bus 1314 may be comprised of a wired and/or wireless communication port (e.g., a Universal Serial Bus ("USB"), a Bluetooth® port, an Ethernet port, and/or a wireless Ethernet port). The low speed bus 1314 may also be coupled to the scan unit 1328, a printer 1326, a keyboard, a mouse 1324, and a networking device (e.g., a switch and/or a router) through a network adapter.

The specific computing device 1300 may be implemented in a number of different forms, as shown in the figure. In one embodiment, the computing device 1300 may be implemented as a standard server 1318 and/or a group of such servers. In another embodiment, the specific computing device 1300 may be implemented as part of a rack server system 1322. In yet another embodiment, the specific computing device 1300 may be implemented as a general computer 1320 such as a laptop or desktop computer. Alternatively, a component from the specific computing device 1300 may be combined with another component in a specific mobile computing device 1330. In one or more embodiments, an entire system may be made up of a plurality of specific computing device 1300 and/or a plurality of specific computing device 1300 coupled to a plurality of specific mobile computing device 1330.

In one embodiment, the specific mobile computing device 1330 may include a mobile compatible processor 1332, a mobile compatible memory 1334, and an input/output device such as a mobile display 1346, a communication interface 1352, and a transceiver 1338, among other components. The specific mobile computing device 1330 may also be provided with a storage device, such as a microdrive or other device, to provide additional storage. In one embodiment, the components indicated heretofore are intercoupled using various buses, and several of the components may be mounted on a common motherboard.

The mobile compatible processor 1332 may execute instructions in the specific mobile computing device 1330, including instructions stored in the mobile compatible memory 1334. The mobile compatible processor 1332 may be implemented as a chipset of chips that include separate and multiple analog and digital processors. The mobile compatible processor 1332 may provide, for example, for coordination of the other components of the specific mobile computing device 1330, such as control of user interfaces, applications run by the specific mobile computing device 1330, and wireless communication by the specific mobile computing device 1330.

The mobile compatible processor 1332 may communicate with a user through the control interface 1336 and the display interface 1344 coupled to a mobile display 1346. In one embodiment, the mobile display 1346 may be a Thin-Film-Transistor Liquid Crystal Display ("TFT LCD"), an Organic Light Emitting Diode ("OLED") display, and another appropriate display technology. The display interface 1344 may comprise appropriate circuitry for driving the mobile display 1346 to present graphical and other information to a user. The control interface 1336 may receive commands from a user and convert them for submission to the mobile compatible processor 1332.

In addition, an external interface 1342 may be provide in communication with the mobile compatible processor 1332, so as to enable near area communication of the specific mobile computing device 1330 with other devices. External interface 1342 may provide, for example, for wired communication in some embodiments, or for wireless communication in other embodiments, and multiple interfaces may also be used.

The mobile compatible memory 1334 may be coupled to the specific mobile computing device 1330. The mobile compatible memory 1334 may be implemented as a volatile memory and a non-volatile memory. The expansion memory 1358 may also be coupled to the specific mobile computing device 1330 through the expansion interface 1356, which may comprise, for example, a Single In Line Memory Module ("SIMM") card interface. The expansion memory 1358 may provide extra storage space for the specific mobile computing device 1330, or may also store an application or other information for the specific mobile computing device 1330.

Specifically, the expansion memory 1358 may comprise instructions to carry out the processes described above. The expansion memory 1358 may also comprise secure information. For example, the expansion memory 1358 may be provided as a security module for the specific mobile computing device 1330, and may be programmed with instructions that permit secure use of the specific mobile computing device 1330. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 1334, the expansion memory 1358, a memory coupled to the mobile compatible processor 1332, and a propagated signal that may be received, for example, over the transceiver 1338 and/or the external interface 1342.

The specific mobile computing device 1330 may communicate wirelessly through the communication interface 1352, which may be comprised of a digital signal processing circuitry. The communication interface 1352 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 1338 (e.g., radio-frequency transceiver). In addition, short-range communication may occur, such as using a Bluetooth®, Wi-Fi, and/or other such transceiver. In addition, a GPS ("Global Positioning System") receiver module 1354 may provide additional navigation-related and location-related wireless data to the specific mobile computing device 1330, which may be used as appropriate by a software application running on the specific mobile computing device 1330.

The specific mobile computing device 1330 may also communicate audibly using an audio codec 1340, which may receive spoken information from a user and convert it to usable digital information. The audio codec 1340 may likewise generate audible sound for a user, such as through a speaker (e.g., in a handset smartphone of the specific mobile computing device 1330). Such a sound may comprise a sound from a voice telephone call, a recorded sound (e.g., a voice message, a music files, etc.) and may also include a sound generated by an application operating on the specific mobile computing device 1330.

The specific mobile computing device 1330 may be implemented in a number of different forms, as shown in the figure. In one embodiment, the specific mobile computing device 1330 may be implemented as a smartphone 1348. In another embodiment, the specific mobile computing device 1330 may be implemented as a personal digital assistant ("PDA"). In yet another embodiment, the specific mobile computing device, 1330 may be implemented as a tablet device 1350.

An example embodiment will now be described. The SewTextile Inc. may be active in manufacturing fashionable and affordable clothing through its production facility situated in Lewiston, Me. The SewTextile Inc. may have varied range of consumers, individual as well as retail store chains, purchasing its products. The SewTextile Inc. consumers may be located in segregated geographical areas requiring it to send its products to remote places through mail. The Sew- Textile Inc. may be using postal mail services of leading logistic provider, FredsMail Corp., for sending its bulk mail orders to its consumers.

The FredsMail Corp., may be offering discounts to its clients on their bulk mailing orders based on its various preset criteria including minimum number of goods, weight limits, ability of FredsMail Corp. to process the goods by machine, etc. For availing discounts in postal charges of its mail, the SewTextile Inc. may have to fulfill these preset criteria set by the FredsMail Corp. Due to its varying consumer interests and their locations, the SewTextile Inc. may be failing to fulfill a few of preset criteria set by the FredsMail Corp. resulting into non-applicability of the discount rates offered by FredsMail Corp. to its mail, making it an unsatisfied customer of FredsMail Corp. due to loss of its revenue in logistics.

In order to win its customer satisfaction back, the FredsMail Corp. may have decided to use the technology described herein using various embodiments of FIGS. 1-13. The use of technologies described in various embodiments of FIGS. 1-13 enabled FredsMail Corp. to presort (e.g., using sorting 602 of the mail pre-process server 100) the mail orders of SewTextile Inc. and place it in the containers by order (e.g., using packaging 608 of the mail pre-process server 100). The FredsMail Corp. may now be able to offer additional discounts to the SewTextile Inc., due to reduction in transportation and distribution cost, for both its bulk orders and piecewise.

The use of technologies described in various embodiments of FIGS. 1-13 allowed FredsMail Corp. reduce its logistics handling costs without requiring to ship its bulk mail orders to corresponding DNDC, DSCF and/or the DDU. The FredsMail Corp. may now be able to offer significant destination discounts (e.g., using minimum bulk mailing quantity policy 124 of the mail pre-process server 100) to SewTextile Inc. Thus, SewTextile Inc. may now be a happy customer. In addition, the SewTextile Inc.'s may have increased its bulk mail orders to FredsMail Corp. resulting in more revenue and profit for FredsMail Corp.

Another example embodiment will now be described. Jane Smith, an individual, desires to order 100 Greeting Cards from an online store-front. Jane Smith selects from a variety of pre-defined templates and uploads the name and addresses of the recipients that will receive the cards. Jane Smith selects the options to mail the 100 Greeting Cards using the USPS® and will pay non-discounted First-Class® postage without the use of the technologies described in the various embodiments of FIGS. 1-13.

The online store-front using the technologies described in various embodiments of FIGS. 1-13 is able to provide Jane Smith with bulk mailing discounts because of the technologies described in various embodiments of FIGS. 1-13. Jane Smith does not know that there may be 1,000 other individuals ordering the same, pre-defined Greeting Card or other type of print media with the same mail piece characteristics. These mail pieces will be combined with other like mail pieces with the same mail piece characteristics 202 via the digital pre-print mail files 200 and sent to the first printing company 120A or second printing company 120B in the approved network for mailing 806 at the nearest logistical node 122 for the lowest discounted postal rate 700A/700B with the deepest postal discounts.

Without the technologies described in various embodiments of FIGS. 1-13 a physical vehicle or other transportation method, such as a logistic company with freight trucks, must pick up the physical mail pieces and possibly drive across country Jane Smith's 100 Greeting Cards, along with the other 1,000 different individual orders and associated mail pieces across the nation, to obtain the same discounts, which is physically impossible and inefficient.

Another example embodiment will now be described. ACME Logistics Company may be a service provider offering logistics solutions for commercial mailing to its users. For its bulk mailing orders, the ACME Logistics Company may have to print large quantities of mail pieces with correct post addresses and machine-readable barcode requiring use of its valuable resources. The ACME Logistics Company may not be able to handle its bulk mail orders efficiently due to use of traditional methods of mailing.

To increase its efficiency in handling bulk mail orders, the ACME Logistics Company may have decided to invest in the technologies described in various embodiments of FIGS. 1-13. With use of technologies described in various embodiments of FIGS. 1-13, the ACME Logistics Company may now be able to subcontract printing of its large quantity of mail pieces to a certified local printer (e.g., using minimum bulk mailing quantity policy 124 of the mail pre-process server 100) to have the post address and machine-readable barcode pre-printed (e.g., using mailing metadata 612 of the mail pre-process server 100) on its mail pieces.

The ACME Logistics Company may now be able to presort its mail orders (e.g., using set of bulk-mailing requests 112 of the mail pre-process server 100) according to NDC, SCF, DU, carrier route, and/or carrier walk sequence, format in standardized barcode (e.g., using uniquely identified print request data 118A/118B of the mail pre-process server 100), and deliver it to the addressee efficiently. Further, use of technologies described in various embodiments of FIGS. 1-13 enabled ACME Logistics Company to update its mailing list, pre-stamp and pre-cancel its mail pieces by applying appropriate destination discounts to its mail orders. The use of technologies described in various embodiments of FIGS. 1-13 helped ACME Logistics Company manage its resources efficiently and profitably.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 1024 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

Figure 14:
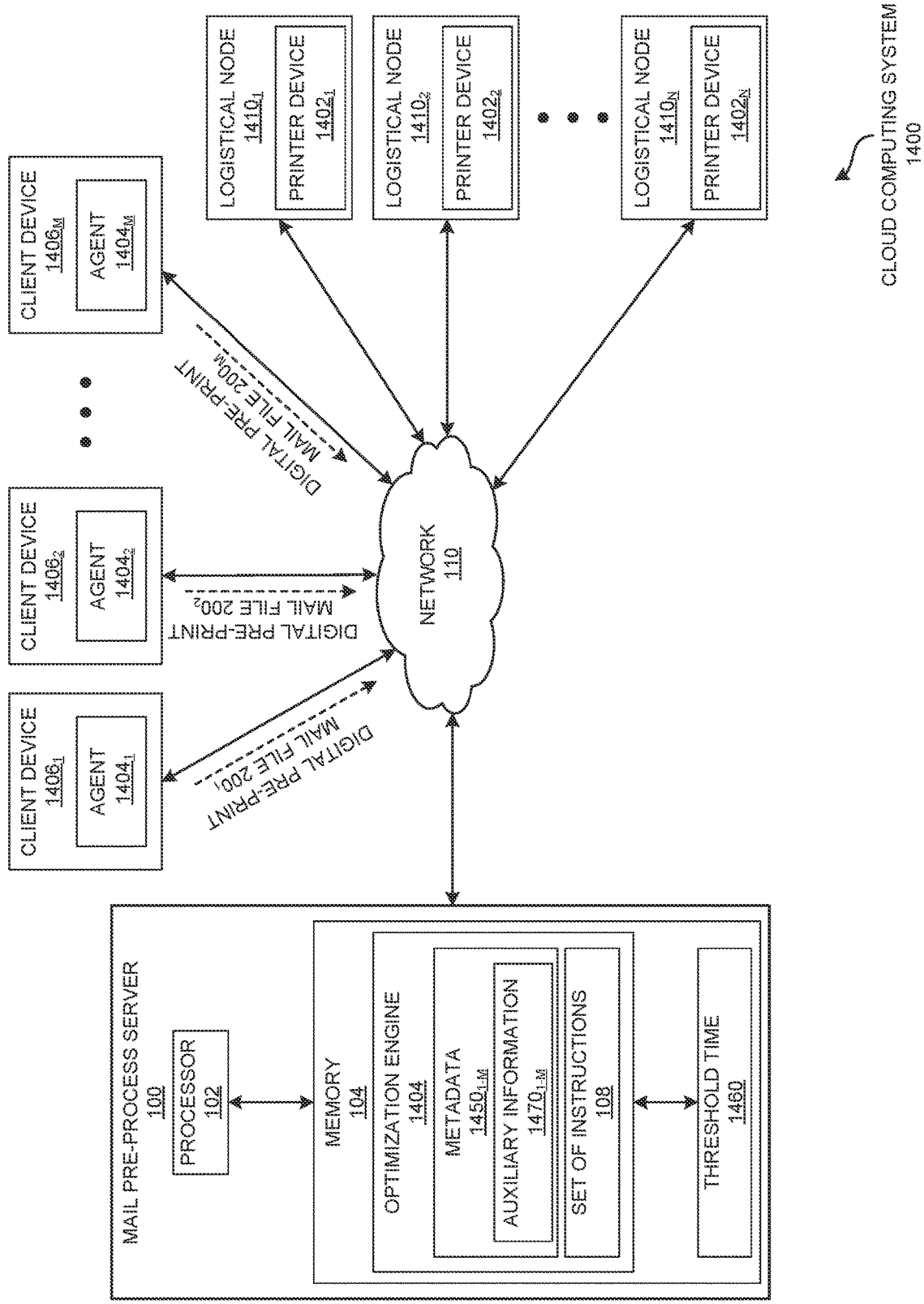
FIG. 14 is a schematic view of a cloud computing system in which the mail pre-process server of FIG. 1 interacts with a number of printer devices through a network, according to one or more embodiments.

FIG. 14 shows a cloud computing system 1400 in which mail pre-process server 100 interacts with a number of printer devices $1402_{1-N}$ through network 110 (e.g., a computer network such as a WAN). In one or more embodiments, set of instructions 108 discussed above may be part of a optimization engine 1404 (e.g., a set of modules) executing on mail pre-process server 100. In one or more embodiments, a number of client devices $1406_{1-M}$ (e.g., mobile devices and/or computing devices such as laptops, desktops, notebook computers etc.) may be capable of interacting with mail pre-process server 100 through an agent $1404_{1-M}$ of optimization engine 1404 executing thereon. In one or more embodiments, client devices $1406_{1-M}$ may be communicatively coupled to mail pre-process server 100 through network 110. As shown in FIG. 14, mail pre-process server 100 may be communicatively coupled to printer devices $1402_{1-N}$ also through network 110.

In an example embodiment, client devices $1406_{1-M}$ may represent individuals/entities (e.g., businesses) uploading the source and destination information of physical mail pieces 126A/B discussed above through a website (example agent $1404_{1-M}$) providing an appropriate user interface therefor. Other forms of agent $1404_{1-M}$ are within the scope of the exemplary embodiments discussed herein. The aforementioned uploads may be that of digital pre-print mail file(s) 200 (here digital pre-print mail file(s) $200_{1-M}$), each of which is in the form of a document and/or an image. In one or more embodiments, each digital pre-print mail file $200_{1-M}$ may be automatically analyzed (e.g., scanned) through optimization engine 1404 following upload thereof to dynamically extract metadata $1450_{1-M}$ (e.g., mailing metadata 612) therefrom. In one or more embodiments, optimization engine 1404 may be provided with intelligence capabilities enhanced through a Machine Learning (ML) environment whereby portions of a digital pre-print mail file $200_{1-M}$ are scanned to extract information such as, but not limited to, source location, destination location, type of document, document resolution, size of packaging material (or, document size) and so on; the auxiliary information discussed above may also be extracted as metadata $1450_{1-M}$; FIG. 14 shows the extracted metadata $1450_{1-M}$ as part of memory 104, and auxiliary information $1470_{1-M}$ as part of the extracted metadata $1450_{1-M}$.

Figure 15:
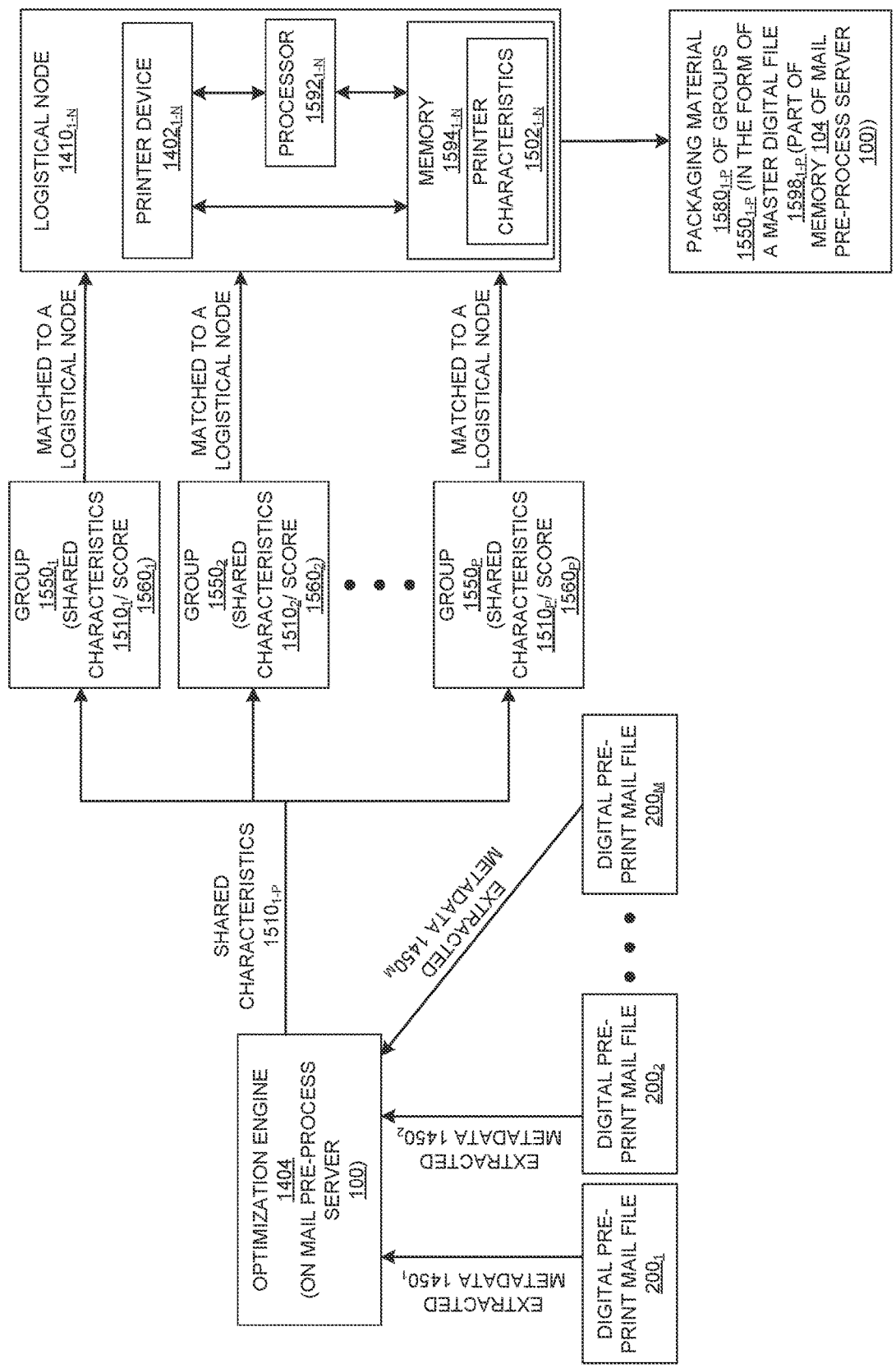
FIG. 15 is a schematic view of an optimization engine of FIG. 14 dynamically performing collation of extracted metadata from each digital pre-print mail file uploaded through a corresponding client device, according to one or more embodiments.

FIG. 15 shows optimization engine 1404 dynamically performing collation of extracted metadata $1450_{1-M}$ from each digital pre-print mail file $200_{1-M}$ uploaded through a corresponding client device $1406_{1-M}$. In one or more embodiments, optimization engine 1404 may group digital pre-print mail file(s) $200_{1-M}$ based on shared characteristics $1510_{1-P}$ (e.g., destination location, type of document, document resolution, size of packaging material) therebetween determined from the collation of the extracted metadata $1450_{1-M}$; FIG. 15 shows groups $1550_{1-P}$ of digital pre-print mail file(s) $200_{1-M}$ with scores $1560_{1-P}$ allotted thereto indicating the degree of matching. In one or more embodiments, said grouping may be limited to a dynamically determined window of time (e.g., threshold time 1460 stored in memory 104 in FIG. 14) because dispatching of mailing items is time bound.

In one or more embodiments, printer devices $1402_{1-N}$ may be distributed across the cloud/network 110 and may be associated with printing companies (e.g., first printing company 120A/second printing company 120B). In one or more embodiments, each printer device $1402_{1-N}$ may have a logistical node $1410_{1-N}$ (e.g., a data processing device/server) associated therewith to control printing therethrough. In one or more embodiments, printer characteristics $1502_{1-N}$ (e.g., document resolution supported, geographical location of printer device $1402_{1-N}$, availability, costs) for each printer device $1402_{1-N}$ may be stored in a memory $1594_{1-N}$ (e.g., a volatile and/or a non-volatile memory) of the corresponding logical node $1410_{1-N}$ thereof. FIG. 15 shows each logistical node $1410_{1-N}$ with a processor $1592_{1-N}$ communicatively coupled to memory $1594_{1-N}$.

In one embodiment, printer devices $1402_{1-N}$ may be communicatively coupled to mail pre-process server 100 through network 110 via logistical node $1410_{1-N}$ as shown in FIG. 14. In another example embodiment, each logistical node $1410_{1-N}$ may itself be communicatively coupled to a corresponding printer device $1402_{1-N}$ through network 110. In one or more embodiments, printer characteristics $1502_{1-N}$ discussed above may be dynamically modified in accordance with periodic bidirectional communication between optimization engine 1404 and logistical node $1410_{1-N}$. For example, mail pre-process server 100 may be aware of a printer device $1402_{1-N}$ being down through optimization engine 1404 and the updated printer characteristics $1502_{1-N}$ accessed therethrough.

In one or more embodiments, groups $1550_{1-P}$ may be dynamically matched across network 110 to logistical nodes $1410_{1-N}$/printer devices $1402_{1-N}$ based on the dynamically determined printer characteristics $1502_{1-N}$; if required, some digital pre-print mail file(s) $200_{1-M}$ may be redistributed across existing groups $1550_{1-P}$ or regrouped under one or more new group(s) $1550_{1-P}$. In one or more embodiments, once matching of groups $1550_{1-P}$ to logistical nodes $1410_{1-N}$/printer devices $1402_{1-N}$ is done, printer devices $1402_{1-N}$ may be able to print packaging material/envelopes (e.g., packaging material $1580_{1-P}$) customized in accordance with the extracted metadata $1450_{1-M}$ from digital pre-print mail file(s) $200_{1-M}$. In one example embodiment, for the aforementioned purpose, optimization engine 1404 may be configured to generate a master digital file $1598_{1-P}$ based on commingling the extracted metadata $1450_{1-M}$ from all digital pre-print mail file(s) $200_{1-M}$ within a group $1550_{1-P}$ for each group $1550_{1-P}$. Here, master digital file $1598_{1-P}$ may be in the form of a master document in which the extracted metadata $1450_{1-M}$ is intelligently laid out as per the requirements of the entities uploading the digital pre-print mail file(s) $200_{1-M}$. Said master digital file $1598_{1-P}$ (e.g., part of memory 104 of mail pre-process server 100) may be transmitted to the appropriate logistical node $1410_{1-N}$ for printing purposes.

In one or more embodiments, it is possible to envision a change in mind with regard to an entity associated with a client device $1406_{1-M}$. For example, said entity may decide to include a personalized message on the envelope to be printed and/or specify a fancier packaging material. Here, said entity may merely need to initiate the change through agent $1404_{1-M}$ within a dynamically determined threshold window of time (e.g., threshold time 1460) after the determination of groups $1550_{1-P}$ discussed above. Optimization engine 1404 may detect the change and (newly) dynamically determine a (new) group $1550_{1-P}$ into which the modified digital pre-print mail file $200_{1-M}$ is classified. Depending on the new grouping, the modified digital pre-print mail file $200_{1-M}$ may be assigned to a new logistical node $1410_{1-N}$ or the same logistical node $1410_{1-N}$.

Figure 16:
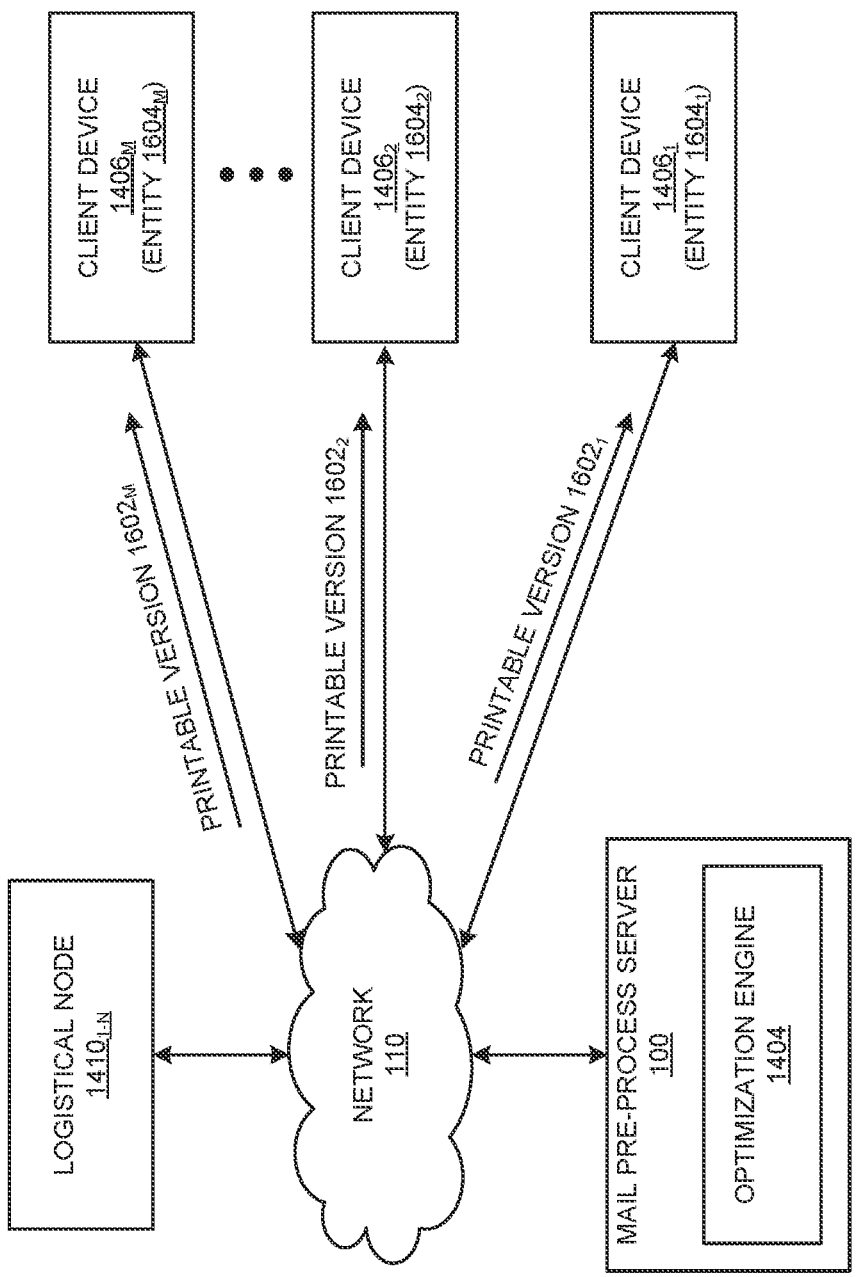
FIG. 16 is a schematic view of transmission of printable versions of a master digital file/document to entities associated with client devices of FIG. 14, according to one or more embodiments.

In one or more embodiments, the capability provided to an entity to change digital pre-print mail file(s) $200_{1-M}$ after initial upload thereof renders cloud computing system 1400 logistically dynamic. In one or more embodiments, following the grouping, optimization engine 1404 may transmit printable versions of documents (e.g., from master digital file $1598_{1-P}$) to respective client devices $1406_{1-M}$ for previewing/viewing therethrough. FIG. 16 illustrates the transmission of printable versions $1602_{1-M}$ to entities $1604_{1-M}$ associated with client devices $1406_{1-M}$; said transmission may be in the form of text messages with hyperlinks, multimedia messages, e-mails and so on; other forms of transmission are within the scope of the exemplary embodiments discussed herein. In one or more embodiments, an entity $1604_{1-M}$ may then be able to preview printable version $1602_{1-M}$ through client device $1406_{1-M}$.

In one or more embodiments, entity $1604_{1-M}$ may not be restricted to being the sender of physical mail pieces 126A/B. For example, another client device $1406_{1-M}$ may be associated with the receiver of physical mail pieces 126A/B. Here, said receiver may also be able to preview printable version $1602_{1-M}$ (discussed above; again transmitted to another client device $1406_{1-M}$ associated with the receiver) through another client device $1406_{1-M}$. In one or more embodiments, again the receiver may initiate the change in digital pre-print mail file $200_{1-M}$ associated with the sender through agent $1404_{1-M}$ executing on another client device $1406_{1-M}$. Thus, it is possible for both the sender and the receiver to dynamically control the end product printed through a printer device $1402_{1-N}$.

The changes in digital pre-print mail files $200_{1-M}$ may not be restricted to personal preferences alone. For example, costs may be based on the final bulk printing through a printer device $1402_{1-N}$. Here, an entity at client device $1406_{1-M}$ may be able to save costs through modifying (e.g., reducing a size of the output print) the corresponding digital pre-print mail file $200_{1-M}$. In another implementation, bulk printing at a logistical node $1410_{1-N}$/printer device $1402_{1-N}$ (each printer device $1402_{1-N}$ may individually signify a number of printers; a cluster of printers is also possible) may be directed to a specific geographical area of coverage that is affected by war. Here, through action at an agent $1404_{1-M}$ of a client device $1406_{1-M}$, optimization engine 1404 may be configured to route all grouped digital pre-print mail files $200_{1-M}$ destined for a logistical node $1410_{1-N}$/printer device $1402_{1-N}$ to another logistical node $1410_{1-N}$/printer device $1402_{1-N}$ (e.g., close to the war zone but not affected by the war). In another modification, the action may be triggered automatically by optimization engine 1404 based on dynamic updates of memory 104 thereof.

It is to be noted that cloud computing system 1400 is not limited to postal logistics applications. For example, cloud computing system 1400 may be used by an entity submitting standardized test scores of candidates to educational universities in an optimized manner. Also, the end printed product is not restricted to packaging material; said end printed product may actually be the physical mail piece 126A/B (e.g., a standardizable letter). Again, the optimization provided by optimization engine 1404 may enable both the sender and the receiver to be apprised of the printable versions $1602_{1-M}$ and/or the changes in routing thereof dynamically.

In one or more embodiments, dynamic extraction of metadata $1450_{1-M}$ discussed above may enable bringing in or classification of new printer devices $1402_{1-N}$ within cloud computing system 1400 in accordance with the dynamically determined printer characteristics $1502_{1-N}$. In a non-dynamic system, capabilities of existing printer devices $1402_{1-N}$ may be static and, therefore, grouping and routing of digital pre-print mail file(s) $200_{1-M}$ to logistical nodes $1410_{1-N}$/printer devices $1402_{1-N}$ may be inefficient. Exemplary embodiments implemented through cloud computing system 1400 may provide for increased efficiency through dynamic addition of new printer devices $1402_{1-N}$ into cloud computing system 1400 based on dynamically extracted metadata $1450_{1-M}$ from digital pre-print mail file(s) $200_{1-M}$ and dynamically updated printer characteristics $1502_{1-N}$ to address the requirement(s) of printing specified through the digital pre-print mail file(s) $200_{1-M}$. In one or more embodiments, the grouping and the routing of the digital pre-print mail file(s) $200_{1-M}$ may occur after the dynamic addition of new printer devices $1402_{1-N}$.

Figure 17:
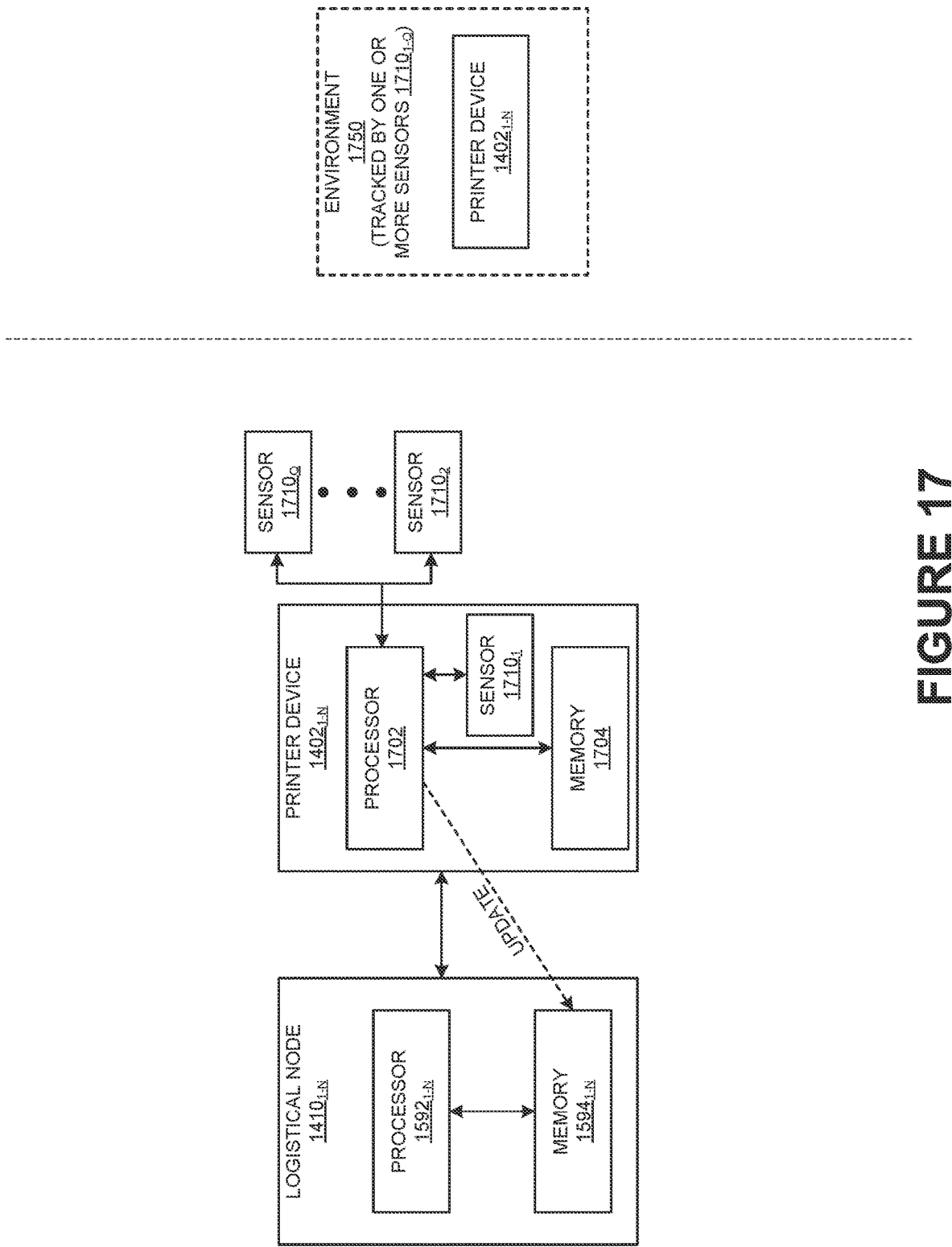
FIG. 17 is a schematic view of an example printer device of FIG. 14 with a processor communicatively coupled to a memory, according to one or more embodiments.

It should be noted that the intelligence/ML built into cloud computing system 1400 may also enable dynamic addition of printer devices $1402_{1-N}$ based on a history of extracted metadata $1450_{1-M}$ stored at memory 104 of mail pre-process server 100 and a dynamic update (e.g., one or more dynamic update(s)) of printer characteristics $1502_{1-N}$. FIG. 17 shows an example printer device $1402_{1-N}$ with a processor 1702 communicatively coupled to a memory 1704. Said example printer device $1402_{1-N}$ may have a number of sensor(s) $1710_{1-Q}$ communicatively coupled to processor 1702 to communicate operating statuses thereof. For example, printer device $1402_{1-N}$ may be low on toner ink, may not have papers of a specific size loaded onto a tray thereof or may have a specific cartridge that requires to be changed. Said status may be communicated to processor 1702 dynamically through sensor(s) $1710_{1-Q}$; processor 1702, in turn, may update memory $1594_{1-N}$ of a logistical node $1410_{1-N}$ corresponding to said printer device $1402_{1-N}$. Thus, printer characteristics $1502_{1-N}$ may be changed to enable optimization engine 1404 exclude said printer device $1402_{1-N}$ from being employed for distribution of digital pre-print mail file(s) $200_{1-M}$ to printer devices $1402_{1-N}$ across network 110. Alternately, the change in printer characteristics $1502_{1-N}$ may enable logistical node $1410_{1-N}$ update an administrator thereof to change components of said printer device $1402_{1-N}$.

It should be noted that sensor(s) $1710_{1-Q}$ may not be limited to sensing functioning of printer device $1402_{1-N}$. In an example embodiment, a bunch of sensor(s) $1710_{1-Q}$ may track an environment 1750 surrounding printer device $1402_{1-N}$. For example, the end printouts may not turn out correctly or may be torn or messed up at the time of collection. These sensor(s) $1710_{1-Q}$ may then enable triggering of a reprinting through printer device $1402_{1-N}$ or a redistribution of the corresponding digital pre-print mail file $200_{1-M}$ to another logistical node $1410_{1-N}$ through logistical node $1410_{1-N}$ associated with printer device $1402_{1-N}$. In another example embodiment, printer device $1402_{1-N}$ may not be used for days or weeks, thereby indicating a problem at logistical node $1410_{1-N}$. Sensor(s) $1710_{1-Q}$ may detect the problem and appropriately communicate to optimization engine 1404 through logistical node $1410_{1-N}$.

Exemplary embodiments (e.g., optimization engine 1404) discussed herein may also be implementable as instructions embodied in a non-transitory medium such as a Compact Disc (CD), Digital Video Disc (DVD), a hard disk and a Blu-Ray™ disc readable through cloud computing system 1400/mail pre-process server 100. Said instructions are executable through cloud computing system 1400/mail pre-process server 100. All reasonable variations are within the scope of the exemplary embodiments discussed herein.

Figure 18:
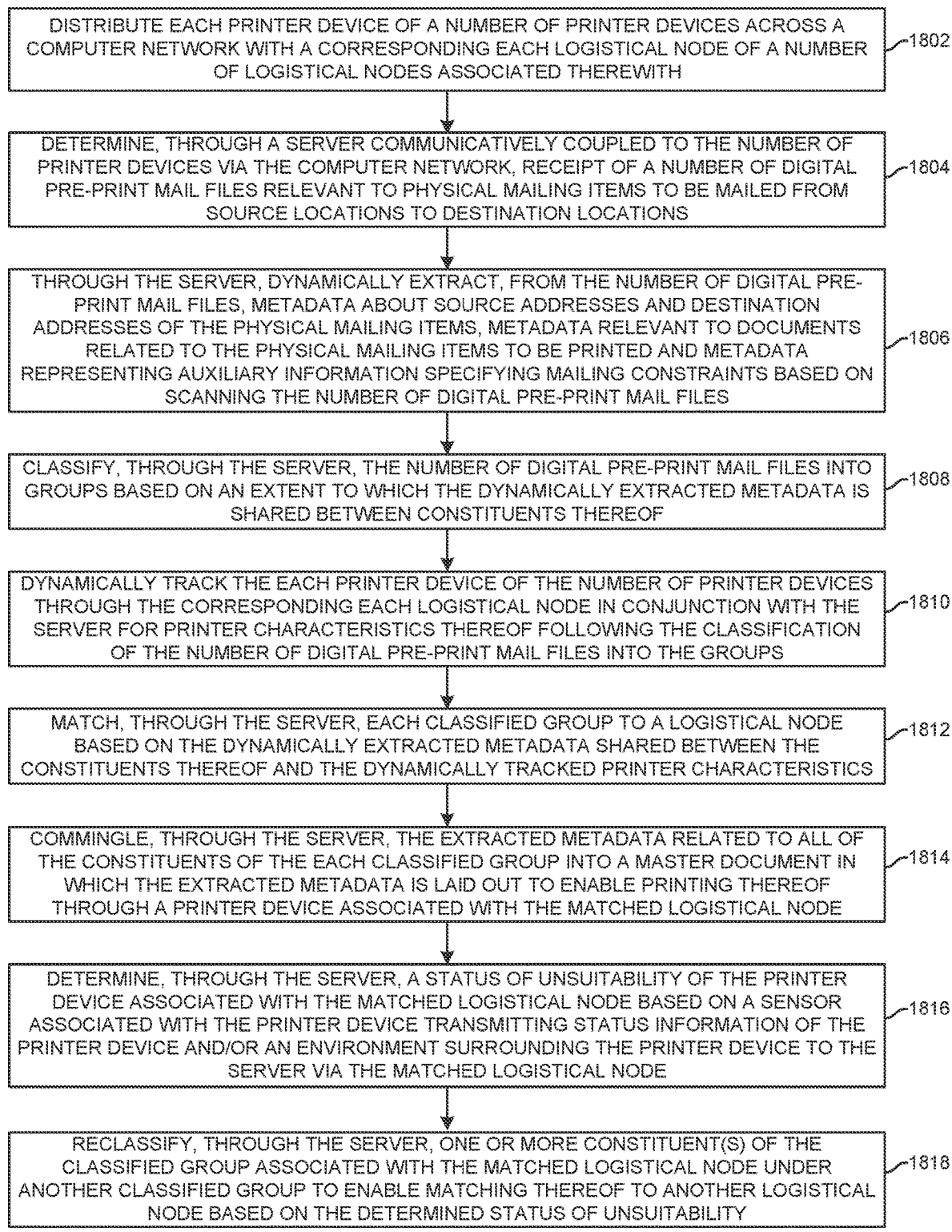
FIG. 18 is a process flow diagram detailing the operations involved in realizing the cloud computing system of FIG. 14, according to one or more embodiments.

FIG. 18 shows a process flow diagram detailing the operations involved in realizing cloud computing system 1400 with printer devices $1402_{1-N}$, according to one or more embodiments. In one or more embodiments, operation 1802 may involve distributing each printer device (e.g., printer device $1402_{1-N}$) of a number of printer devices (e.g., printer devices $1402_{1-N}$) across a computer network (e.g., network 110) with a corresponding each logistical node (e.g., logistical node $1410_{1-N}$) of a number of logistical nodes (e.g., logistical nodes $1410_{1-N}$) associated therewith. In one or more embodiments, the corresponding each logistical node may be a data processing device.

In one or more embodiments, operation 1804 may involve determining, through a server (e.g., mail pre-process server 100) communicatively coupled to the number of printer devices via the computer network, receipt of a number of digital pre-print mail files (e.g., digital pre-print mail files $200_{1-M}$) relevant to physical mailing items (e.g., physical mail pieces 126A/B) to be mailed from source locations to destination locations. In one or more embodiments, each of the number of digital pre-print mail files may be associated with a client device (e.g., $1406_{1-M}$) communicatively coupled to the server through the computer network, and each client device may be related to a physical mailing item.

In one or more embodiments, operation 1806 may involve, through the server, dynamically extracting, from the number of digital pre-print mail files, metadata (e.g., metadata $1450_{1-M}$) about source addresses and destination addresses of the physical mailing items, metadata (metadata $1450_{1-M}$) relevant to documents related to the physical mailing items to be printed and metadata (e.g., metadata $1450_{1-M}$) representing auxiliary information (e.g., auxiliary information $1470_{1-M}$) specifying mailing constraints based on scanning the number of digital pre-print mail files.

In one or more embodiments, operation 1808 may involve classifying, through the server, the number of digital pre-print mail files into groups (e.g., groups $1550_{1-P}$) based on an extent to which the dynamically extracted metadata is shared (e.g., based on shared characteristics $1510_{1-P}$) between constituents thereof. In one or more embodiments, operation 1810 may involve dynamically tracking the each printer device of the number of printer devices through the corresponding each logistical node in conjunction with the server for printer characteristics (e.g., printer characteristics $1502_{1-N}$) thereof following the classification of the number of digital pre-print mail files into the groups.

In one or more embodiments, operation 1812 may involve matching, through the server, each classified group to a logistical node based on the dynamically extracted metadata shared between the constituents thereof and the dynamically tracked printer characteristics. In one or more embodiments, operation 1814 may involve commingling, through the server, the extracted metadata related to all of the constituents of the each classified group into a master document (e.g., master digital file $1598_{1-P}$) in which the extracted metadata is laid out to enable printing thereof through a printer device associated with the matched logistical node.

In one or more embodiments, operation 1816 may involve determining, through the server, a status of unsuitability of the printer device associated with the matched logistical node based on a sensor (e.g., one or more of sensor(s) $1710_{1-Q}$) associated with the printer device transmitting status information of the printer device and/or an environment surrounding the printer device to the server via the matched logistical node. In one or more embodiments, operation 1818 may then involve reclassifying, through the server, one or more constituent(s) of the classified group associated with the matched logistical node under another classified group to enable matching thereof to another logistical node based on the determined status of unsuitability.

As seen above, it is to be noted that cloud computing system 1400 is not limited to postal logistics applications and standardized test core submissions. In another example, a university may provide physical copies of transcripts to students, where optimization of printing of said physical copies is done based on commonality between requests therefor, metadata extracted from pre-print files, group classification and other processes discussed above. One could also envision bulk printing of invitation cards where layout information of the invitation cards is specified through pre-print files. Thus, physical mailing items (e.g., physical mail pieces 126A/126B) may be generalized to physical items and digital pre-print mail files 200 may be generalized to digital pre-print files. Source and destination addresses are merely examples of metadata $1450_{1-M}$ and auxiliary information $1470_{1-M}$ may specify pre-conditions associated with the corresponding number of requests (e.g., bulk mailing requests 112), as discussed above.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system such as cloud computing system 1400/mail pre-process server 100), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method comprising:

distributing each printer device of a plurality of printer devices across a computer network with a corresponding each logistical node of a plurality of logistical nodes associated therewith, the corresponding each logistical node being a data processing device;

determining, through a server communicatively coupled to the plurality of printer devices via the computer network, receipt of a number of digital pre-print files included in a corresponding number of requests, each of which originates from a client device of a plurality of client devices communicatively coupled to the server through the computer network, the number of requests being relevant to printing a number of physical items, the client device of the plurality of client devices originating the each request being relevant to a physical item of the number of physical items, and each of the number of digital pre-print files specifying printing and layout information pertinent to a corresponding physical item of the number of physical items;

through the server, dynamically extracting, from the number of digital pre-print files, metadata relevant to documents related to the number of physical items to be printed and metadata representing auxiliary information specifying pre-conditions associated with the corresponding number of requests based on automatically scanning the each of the number of digital pre-print files;

classifying, through the server, the number of digital pre-print files into groups based on an extent to which the dynamically extracted metadata is shared between constituents thereof;

dynamically tracking the each printer device of the plurality of printer devices through the corresponding each logistical node in conjunction with the server for printer characteristics thereof following the classification of the number of digital pre-print files into the groups;

matching, through the server, each classified group to a logistical node based on the dynamically extracted metadata shared between the constituents thereof and the dynamically tracked printer characteristics;

commingling, through the server, the extracted metadata related to all of the constituents of the each classified group into a master document in which the commingled extracted metadata is laid out for printing thereof through a printer device associated with the matched logistical node;

determining, through the server, a status of unsuitability of the printer device associated with the matched logistical node based on a sensor associated with the printer device transmitting status information of at least one of: the printer device and an environment surrounding the printer device to the server via the matched logistical node, the determined status of unsuitability modifying the printer characteristics of the printer device to at least one of: exclude the printer device for distribution of any of the number of digital pre-print files thereto and update an administrator of the matched logistical node with a requirement to change a component of the printer device; and reclassifying, through the server, at least one constituent of the classified group associated with the matched logistical node under another classified group to enable matching thereof to another logistical node based on the determined status of unsuitability.

2. The method of claim 1, further comprising providing, through the server, a capability to each client device associated with the each digital pre-print file to modify the each digital pre-print file within a dynamically determined window of time following the group classification.

3. The method of claim 2, further comprising detecting, through the server, the modification to the each digital pre-print file to enable extraction of metadata therefrom and regrouping thereof.

4. The method of claim 1, further comprising dynamically adding, through the server, at least one printer device to be distributed across the computer network based on a history of extracted metadata by the server and a dynamic update of printer characteristics associated with the at least one printer device.

5. The method of claim 1, further comprising enabling, through the server, each client device associated with the each digital pre-print file to preview a printable version of a document relevant to the physical item associated therewith.

6. The method of claim 1, further comprising dynamically updating the printer characteristics of the each printer device of the plurality of printer devices in accordance with periodic bidirectional communication between the server and the corresponding each logistical node associated with the each printer device.

7. The method of claim 1, comprising the master document representing at least one of: the physical items associated with the each classified group and packaging material thereof.

8. A non-transitory medium, readable through a server and comprising instructions embodied therein that are executable through the server, comprising:

instructions to distribute each printer device of a plurality of printer devices across a computer network with a corresponding each logistical node of a plurality of logistical nodes associated therewith, the corresponding each logistical node being a data processing device, and the plurality of printer devices being communicatively coupled to the server via the computer network;

instructions to determine receipt of a number of digital pre-print files included in a corresponding number of requests, each of which originates from a client device of a plurality of client devices communicatively coupled to the server through the computer network, the number of requests being relevant to printing a number of physical items, the client device of the plurality of client devices originating the each request being relevant to a physical item of the number of physical items, and each of the number of digital pre-print files specifying printing and layout information pertinent to a corresponding physical item of the number of physical items;

instructions to dynamically extract, from the number of digital pre-print files, metadata relevant to documents related to the number of physical items to be printed and metadata representing auxiliary information specifying pre-conditions associated with the corresponding number of requests based on automatically scanning the each of the number of digital pre-print files;

instructions to classify the number of digital pre-print files into groups based on an extent to which the dynamically extracted metadata is shared between constituents thereof;

instructions to dynamically track the each printer device of the plurality of printer devices in conjunction with the corresponding each logistical node for printer characteristics thereof following the classification of the number of digital pre-print files into the groups;

instructions to match each classified group to a logistical node based on the dynamically extracted metadata shared between the constituents thereof and the dynamically tracked printer characteristics;

instructions to commingle the extracted metadata related to all of the constituents of the each classified group into a master document in which the commingled extracted metadata is laid out for printing thereof through a printer device associated with the matched logistical node;

instructions to determine a status of unsuitability of the printer device associated with the matched logistical node based on a sensor associated with the printer device transmitting status information of at least one of: the printer device and an environment surrounding the printer device to the server via the matched logistical node, the determined status of unsuitability modifying the printer characteristics of the printer device to at least one of: exclude the printer device for distribution of any of the number of digital pre-print files thereto and update an administrator of the matched logistical node with a requirement to change a component of the printer device; and instructions to reclassify at least one constituent of the classified group associated with the matched logistical node under another classified group to enable matching thereof to another logistical node based on the determined status of unsuitability.

9. The non-transitory medium of claim 8, further comprising instructions to provide a capability to each client device associated with the each digital pre-print file to modify the each digital pre-print file within a dynamically determined window of time following the group classification.

10. The non-transitory medium of claim 9, further comprising instructions to detect the modification to the each digital pre-print file to enable extraction of metadata therefrom and regrouping thereof.

11. The non-transitory medium of claim 8, further comprising instructions to dynamically add at least one printer device to be distributed across the computer network based on a history of extracted metadata by the server and a dynamic update of printer characteristics associated with the at least one printer device.

12. The non-transitory medium of claim 8, further comprising instructions to enable each client device associated with the each digital pre-print file to preview a printable version of a document relevant to the physical item associated therewith.

13. The non-transitory medium of claim 8, further comprising instructions to dynamically update the printer characteristics of the each printer device of the plurality of printer devices in accordance with periodic bidirectional communication between the server and the corresponding each logistical node associated with the each printer device.

14. The non-transitory medium of claim 8, comprising instructions compatible with the master document representing at least one of: the physical items associated with the each classified group and packaging material thereof.

15. A server comprising:
a memory; and
a processor communicatively coupled to the memory, the processor executing instructions to:

distribute each printer device of a plurality of printer devices across a computer network with a corresponding each logistical node of a plurality of logistical nodes associated therewith, the corresponding each logistical node being a data processing device, and the plurality of printer devices being coupled to the server through the computer network, determine receipt of a number of digital pre-print files included in a corresponding number of requests, each of which originates from a client device of a plurality of client devices communicatively coupled to the server through the computer network, the number of requests being relevant to printing a number of physical items, the client device of the plurality of client devices originating the each request being relevant to a physical item of the number of physical items, and each of the number of digital pre-print files specifying printing and layout information pertinent to a corresponding physical item of the number of physical items, dynamically extract, from the number of digital pre-print files, metadata relevant to documents related to the number of physical items to be printed and metadata representing auxiliary information specifying pre-conditions associated with the corresponding number of requests based on automatically scanning the each of the number of digital pre-print files, classify the number of digital pre-print files into groups based on an extent to which the dynamically extracted metadata is shared between constituents thereof, dynamically track the each printer device of the plurality of printer devices in conjunction with the corresponding each logistical node for printer characteristics thereof following the classification of the number of digital pre-print files into the groups, match each classified group to a logistical node based on the dynamically extracted metadata shared between the constituents thereof and the dynamically tracked printer characteristics, commingle the extracted metadata related to all of the constituents of the each classified group into a master document in which the commingled extracted metadata is laid out for printing thereof through a printer device associated with the matched logistical node, determine a status of unsuitability of the printer device associated with the matched logistical node based on a sensor associated with the printer device transmitting status information of at least one of: the printer device and an environment surrounding the printer device to the server via the matched logistical node, the determined status of unsuitability modifying the printer characteristics of the printer device to at least one of: exclude the printer device for distribution of any of the number of digital pre-print files thereto and update an administrator of the matched logistical node with a requirement to change a component of the printer device, and reclassify at least one constituent of the classified group associated with the matched logistical node under another classified group to enable matching thereof to another logistical node based on the determined status of unsuitability.

16. The server of claim 15, wherein the processor further executes instructions to provide a capability to each client device associated with the each digital pre-print file to modify the each digital pre-print file within a dynamically determined window of time following the group classification.

17. The server of claim 16, wherein the processor further executes instructions to detect the modification to the each digital pre-print file to enable extraction of metadata therefrom and regrouping thereof.

18. The server of claim 15, wherein the processor further executes instructions to dynamically add at least one printer device to be distributed across the computer network based on a history of extracted metadata by the server and a dynamic update of printer characteristics associated with the at least one printer device.

19. The server of claim 15, wherein the processor further executes instructions to enable each client device associated with the each digital pre-print file to preview a printable version of a document relevant to the physical item associated therewith.

20. The server of claim 15, wherein the processor further executes instructions to dynamically update the printer characteristics of the each printer device of the plurality of printer devices in accordance with periodic bidirectional communication between the server and the corresponding each logistical node associated with the each printer device.

* * * * *